United States Patent
Reed et al.

(10) Patent No.: US 9,864,919 B2
(45) Date of Patent: *Jan. 9, 2018

(54) INCLUDING INFORMATION SIGNALS IN PRODUCT PACKAGING AND OTHER PRINTER MEDIA

(71) Applicant: Digimarc Corporation, Beaverton, OR (US)

(72) Inventors: Alastair M. Reed, Lake Oswego, OR (US); Tomas Filler, Beaverton, OR (US); Kristyn R. Falkenstern, Portland, OR (US); Yang Bai, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,324

(22) Filed: Jun. 27, 2016

(65) Prior Publication Data
US 2017/0024627 A1    Jan. 26, 2017

Related U.S. Application Data

(63) Continuation of application No. 14/616,686, filed on Feb. 7, 2015, now Pat. No. 9,380,186, which is a
(Continued)

(51) Int. Cl.
*G06K 9/00* (2006.01)
*G06K 9/18* (2006.01)
(Continued)

(52) U.S. Cl.
CPC ............ *G06K 9/18* (2013.01); *G06K 9/4652* (2013.01); *G06K 19/06028* (2013.01);
(Continued)

(58) Field of Classification Search
None
See application file for complete search history.

(56) References Cited

U.S. PATENT DOCUMENTS 5,394,483 A    2/1995  Daly
5,862,260 A    1/1999  Rhoads
(Continued)

FOREIGN PATENT DOCUMENTS

WO    WO2016025631 A1    2/2016

OTHER PUBLICATIONS

U.S. Appl. No. 14/932,645, filed Nov. 4, 2015.
(Continued)

*Primary Examiner* — Tahmina Ansari
(74) *Attorney, Agent, or Firm* — Digimarc Corporation

(57) ABSTRACT

The present disclosure relates generally to data hiding for retail product packaging and other printed objects. One embodiment embeds an information signal in a spot color for product packaging. The spot color is screened, and overprinted with process color tint. The tint is modulated prior to overprinting with optimized signal tweaks. The optimization can include consideration of a detector spectral dependency (e.g., red and/or green illumination). Many other embodiments and combinations are described in the subject patent document.

24 Claims, 17 Drawing Sheets
(14 of 17 Drawing Sheet(s) Filed in Color)

Related U.S. Application Data continuation-in-part of application No. 14/588,636, filed on Jan. 2, 2015, now Pat. No. 9,401,001, said application No. 14/616,686 is a continuation-in-part of application No. 13/975,919, filed on Aug. 26, 2013, now Pat. No. 9,449,357.

(60) Provisional application No. 62/102,247, filed on Jan. 12, 2015, provisional application No. 62/063,790, filed on Oct. 14, 2014, provisional application No. 62/063,360, filed on Oct. 13, 2014, provisional application No. 62/036,444, filed on Aug. 12, 2014, provisional application No. 61/923,060, filed on Jan. 2, 2014, provisional application No. 61/749,767, filed on Jan. 7, 2013, provisional application No. 61/693,106, filed on Aug. 24, 2012.

(51) Int. Cl.
| | | |
|---|---|---|
| *H04N 1/32* | (2006.01) | |
| *G06T 1/00* | (2006.01) | |
| *H04N 1/60* | (2006.01) | |
| *H04N 1/62* | (2006.01) | |
| *G06K 9/46* | (2006.01) | |
| *G06K 19/06* | (2006.01) | |
| *G06T 7/90* | (2017.01) | |

(52) U.S. Cl.
CPC .......... *G06T 1/0021* (2013.01); *G06T 1/0028* (2013.01); *G06T 7/90* (2017.01); *H04N 1/32251* (2013.01); *H04N 1/32267* (2013.01); *H04N 1/32309* (2013.01); *H04N 1/6008* (2013.01); *H04N 1/6013* (2013.01); *H04N 1/622* (2013.01); *G06T 2201/0051* (2013.01); *G06T 2201/0202* (2013.01); *H04N 1/628* (2013.01)

(56) References Cited

U.S. PATENT DOCUMENTS

| | | | |
|---|---|---|---|
| 5,905,819 A | 5/1999 | Daly | |
| 6,122,403 A | 9/2000 | Rhoads | |
| 6,157,735 A * | 12/2000 | Holub | G06F 3/1267 |
| | | | 348/E17.004 |
| 6,345,104 B1 | 2/2002 | Rhoads | |
| 6,408,082 B1 | 6/2002 | Rhoads et al. | |
| 6,449,377 B1 | 9/2002 | Rhoads | |
| 6,559,975 B1 | 5/2003 | Tolmer et al. | |
| 6,590,996 B1 | 7/2003 | Reed et al. | |
| 6,614,914 B1 | 9/2003 | Rhoads et al. | |
| 6,631,198 B1 | 10/2003 | Hannigan et al. | |
| 6,718,046 B2 | 4/2004 | Reed et al. | |
| 6,721,439 B1 | 4/2004 | Levy et al. | |
| 6,763,123 B2 | 7/2004 | Reed et al. | |
| 6,763,124 B2 * | 7/2004 | Alattar | G06Q 40/04 |
| | | | 375/E7.018 |
| 6,891,959 B2 | 5/2005 | Reed et al. | |
| 6,912,295 B2 | 6/2005 | Reed et al. | |
| 6,947,571 B1 | 9/2005 | Rhoads et al. | |
| 6,993,149 B2 * | 1/2006 | Brunk | G06K 15/02 |
| | | | 382/100 |
| 7,027,614 B2 | 4/2006 | Reed | |
| 7,070,252 B2 | 7/2006 | DeQueiroz et al. | |
| 7,352,878 B2 | 4/2008 | Reed et al. | |
| 7,783,130 B2 | 8/2010 | Watson | |
| 8,094,869 B2 * | 1/2012 | Reed | G06T 1/0042 |
| | | | 382/100 |
| 8,199,969 B2 | 6/2012 | Reed | |
| 8,310,718 B2 | 11/2012 | Chapman et al. | |
| 8,743,158 B2 * | 6/2014 | Kang | G09G 3/3413 |
| | | | 345/690 |
| 9,179,033 B2 | 11/2015 | Reed et al. | |
| 9,380,186 B2 * | 6/2016 | Reed | H04N 1/32309 |
| 9,401,001 B2 | 7/2016 | Reed et al. | |
| 9,449,357 B1 | 9/2016 | Lyons et al. | |
| 2003/0189568 A1 * | 10/2003 | Alkouh | G06T 15/50 |
| | | | 345/422 |
| 2005/0114667 A1 | 5/2005 | Haas | |
| 2006/0165311 A1 | 7/2006 | Watson | |
| 2010/0150434 A1 | 6/2010 | Reed | |
| 2012/0014557 A1 | 1/2012 | Reed et al. | |
| 2013/0329006 A1 * | 12/2013 | Boles | H04N 1/40056 |
| | | | 348/42 |
| 2014/0119593 A1 | 5/2014 | Filler | |
| 2015/0156369 A1 * | 6/2015 | Reed | H04N 1/32309 |
| | | | 382/100 |
| 2015/0187039 A1 | 7/2015 | Reed et al. | |
| 2016/0198064 A1 * | 7/2016 | Bai | H04N 1/32309 |
| | | | 382/100 |

OTHER PUBLICATIONS

U.S. Appl. No. 13/975,919, filed Aug. 26, 2013.
U.S. Appl. No. 62/102,247, filed Jan. 12, 2015.
International Search Report and Written Opinion dated Nov. 25, 2015 from PCT/US2015/044904.
Wyble et al., "A critical review of spectral models applied to binary color printing," Color Research & Application, 25(1):4-19, 2000.
Scott J. Daly, "Visible differences predictor: an algorithm for the assessment of image fidelity", Proc. SPIE 1666, Human Vision, Visual Processing, and Digital Display III, 2 (Aug. 27, 1992).
X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif, USA, Jun. 1996.
Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
R. Lyons et al, "Geometric enumerated chrominance watermark for spot colors," In Q. Lin, J.P. Alleback and Z. Fan, editors, Proceedings SPIE 8664, Imaging and Printing in a Web 2.0 World IV, vol. 8664, Mar. 2013.
Reed et al., "Full-color visibility model using CSF which varies spatially with local luminance." In Q. Lin, J. P. Allebach, and Z. Fan, editors, Proceedings SPIE 9027, Imaging and Multimedia Analytics in a Web and Mobile World 2014, vol. 9027, 2014.
Reed et al., "Watermarking Spot Colors in Packaging," Media Watermarking, Security and Forensics 2015, edited by Adnan M. Alattar, Nasir D. Memon, Chad D. Heitzenrater, Proc. of SPIE-IS&T vol. 9409, 940906.
A. Wächter and L. T. Biegler, "On the implementation of a primal-dual interior point filter line search algorithm for large-scale non-linear programming " Mathematical Programming, vol. 106, issue (1): pp. 25-57, 2006.
Deshpande, K. and Green, P. "A simplified method of predicting the colorimetry of spot color overprints," 18th Color Imaging Conference: Color Science and Engineering Systems, Technologies and Applications, p. 213-216, San Antonio, USA 2010.
Fleet et al., "Embedding Invisible Information in Color Images," Proc. Int. Conf. on Image Processing, vol. 1, pp. 532-535, Oct. 1997.
Reed et al, "Adaptive Color Watermarking," Proc. SPIE, vol. 4675, pp. 222-229, 8 pages, Jan. 21, 2002.
Vidal, "Non-Noticeable Information Embedding in Color Images: Marking and Detection," 1999 IEEE, pp. 293-297.
Piva et al., "Exploiting the Cross-Correlation of RGB-Channels for Robust Watermarking of Color Images," 1999 IEEE, pp. 306-310.
Battialo et al., "Robust Watermarking for Images Based on Color Manipulation," IH/99 LNCS 1768, pp. 302-317, 2000.

\* cited by examiner

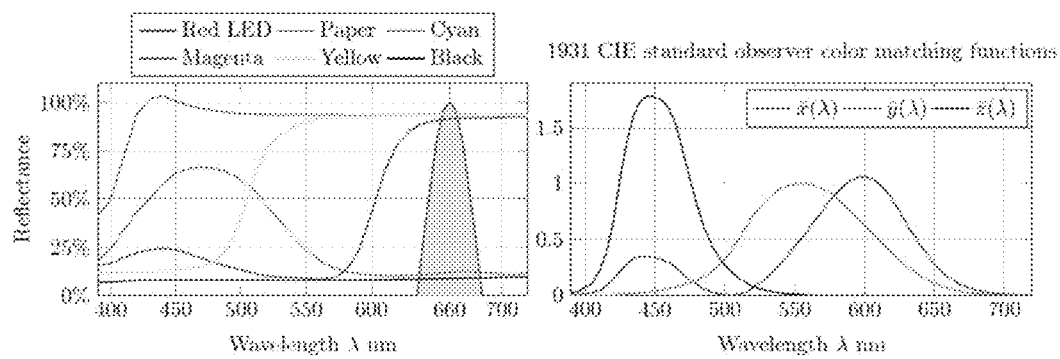
FIG. 1a  FIG. 1b
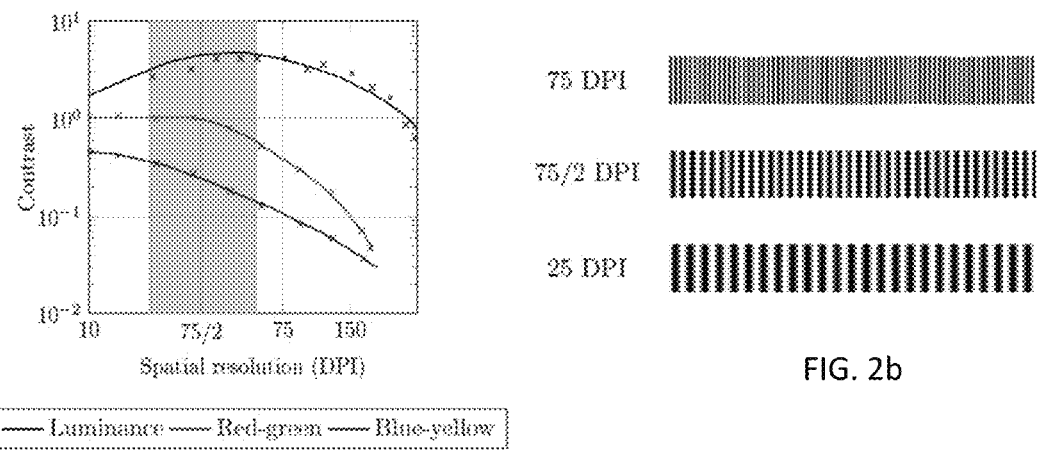
FIG. 2a
FIG. 2b

Fig. 5a
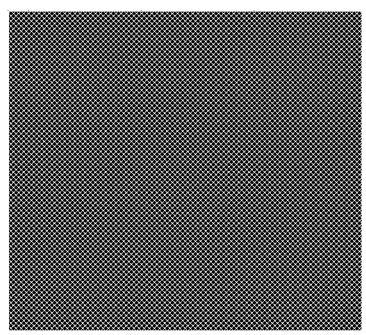
Fig. 5b
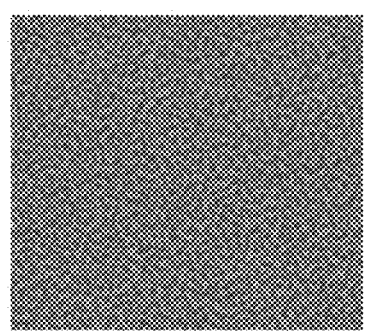
Fig. 5c
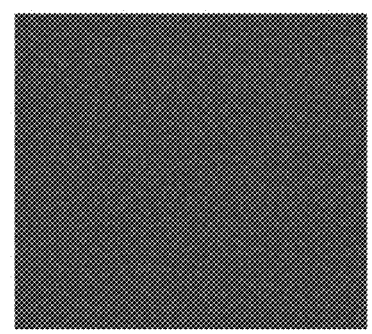
max  min    max  min
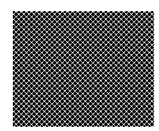 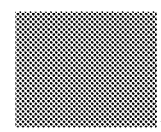   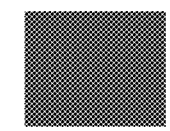 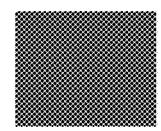
Fig. 5d          Fig. 5e
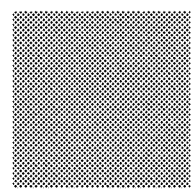   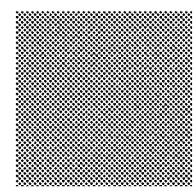
Fig. 6a          Fig. 6b

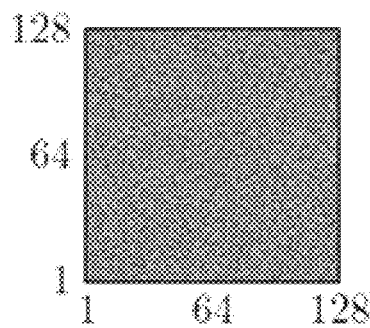
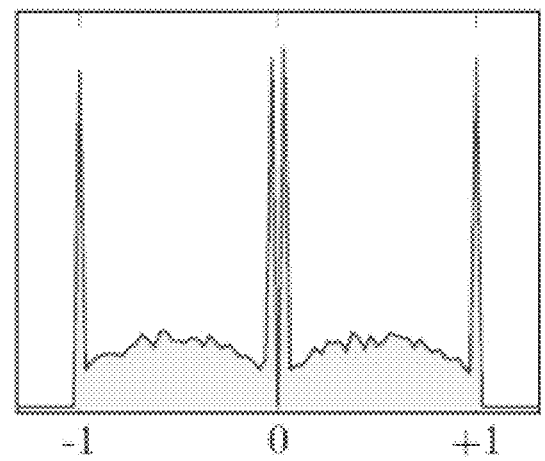
Fig. 8a             Fig. 8b
Mid-gray CMY patch
Chrominance watermark          Cyan only
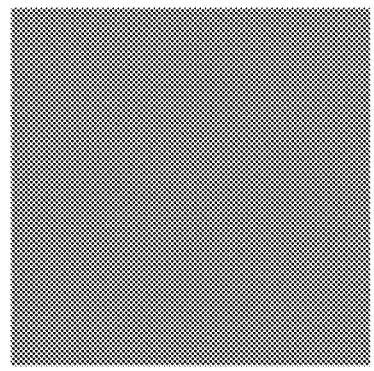
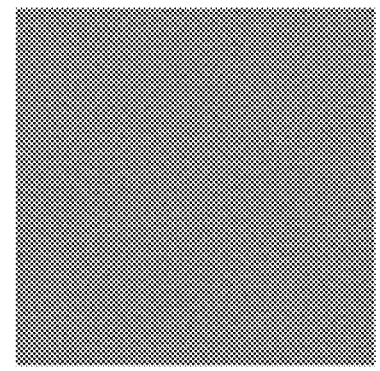
Fig. 9

Compressed white - 4%C 2%M 2%Y

Chrominance watermark         Cyan only

INCLUDING INFORMATION SIGNALS IN PRODUCT PACKAGING AND OTHER PRINTER MEDIA

RELATED APPLICATION DATA

This application is a continuation of U.S. patent application Ser. No. 14/616,686, filed Feb. 7, 2015 (now U.S. Pat. No. 9,380,186) which claims the benefit of U.S. Patent Application Nos. 62/102,247, filed Jan. 12, 2015, 62/063,790, filed Oct. 14, 2014, 62/063,360, filed Oct. 13, 2014, and 62/036,444, filed Aug. 12, 2014.

U.S. patent application Ser. No. 14/616,686 is also a continuation in part of U.S. patent application Ser. No. 14/588,636, filed Jan. 2, 2015 (published as US 2015-0187039 A1, and issued as U.S. Pat. No. 9,401,001), which claims the benefit of U.S. Provisional application No. 61/923,060, filed Jan. 2, 2014.

U.S. patent application Ser. No. 14/616,686 is also a continuation in part of U.S. patent application Ser. No. 13/975,919, filed Aug. 26, 2013, and issued as U.S. Pat. No. 9,449,357, which claims the benefit of US Provisional Application Nos. 61/749,767, filed Jan. 7, 2013 and 61/693,106, filed Aug. 24, 2012.

This application is also related to U.S. Pat. No. 8,199,969, US Published Patent Application Nos. US 2010-0150434 A1 and US 2013-0329006 A1; and U.S. Provisional Application Nos. 62/106,685, filed Jan. 22, 2015, 62/102,547, filed Jan. 12, 2015, 61/693,106, filed Aug. 24, 2012, 61/716,591, filed Oct. 21, 2012, and 61/719,920, filed Oct. 29, 2012.

Each of the above patent documents is hereby incorporated herein by reference in its entirety.

TECHNICAL FIELD

The present disclosure relates generally to color science technology, data hiding and digital watermarking, particularly for product packaging and other printed objects.

BACKGROUND AND SUMMARY

The term "steganography" generally implies data hiding. One form of data hiding includes digital watermarking. For purposes of this disclosure, the terms "digital watermark," "watermark" and "data hiding" are used interchangeably. We sometimes use the terms "embedding," "embed," and "data hiding" to mean modulating or transforming data representing imagery or video to include information therein. For example, data hiding may seek to hide or embed an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. One way to modulate a host signal, as described in detail herein, is to overprint a first color with additional colors. The additional colors may carry or represent the information signal.

Some of the present assignee's work in steganography, data hiding and digital watermarking is reflected, e.g., in U.S. Pat. Nos.: 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

This disclosure focuses on data hiding with printed colors, e.g., embedding information signals in so-called spot colors and process colors. Of course, our techniques, methods and systems will be useful for other color schemes as well, e.g., digital printing.

Spot colors may include premixed inks for use instead of or in addition to process color inks. In many print environments, each spot color ink typically uses its own printing plate on a print press. Spot colors can be used instead of or in addition to process colors for better color accuracy, better color consistency, and colors outside of process ink gamut and for technologies which are prone to specific printing errors. A common spot color system is PANTONE (http://www.pantone.com/). The PANTONE system defines several hundred different inks.

Process colors can be printed using a combination of four standard process inks: Cyan, Magenta, Yellow and Black (CMYK). Considering that every color used in some printing presses uses its own plate, it is highly impractical to print using every color in a design. Process color printing was developed, in part, to address this impracticality, since most colors can be accurately approximated with a combination of these four process colors, CMYK. To create a process color which includes multiple inks, overprinting can be used.

Similar to CMYK, it is usually possible to print a percentage of a given spot color. We refer to printing less than 100% of a spot color as "screening" (or "a screen") the spot color or as a "spot color tint". There are sometimes advantages to using process color equivalent tint. The process color equivalent tint can be a combination of CMYK percentages which produce an approximation color for an original spot color or spot color tint. Process colors can be printed with, e.g., half tone dots.

Overprinting is the process of printing one or more colors on top of another in the reproduction of a design. Because of physical differences between inks and substrate, the result of printing directly onto the substrate versus onto another ink may differ and can be considered in a print run. In some situations, it is necessary to print the desired color using a single ink or a spot color.

Various materials and techniques can be used in the printing process which can be considered for data hiding for spot colors and process colors, these materials include: substrate, process colors, overprinting, spot colors, spot tint (screening) and process equivalent tints. In printing, the term "substrate" refers to a base material which a design is printed onto. Most often, a substrate comprises paper which can be a variety of weights and finishes. Other common substrates in commercial printing include films, plastics, laminated plastics and foils.

Some color science background along with our improvements and additions are provided, below.

The color of an object is often the result of an interaction between a light source, an object and a detector (e.g., the human visual system). Other detectors include point of sale captured systems, mobile phone cameras, barcode readers, etc.

Light is radiation which can be seen, in the wavelength range of about 380 to 780 nm.

Spectral reflectance can be used to describe how an object interacts with light. When reflected light is detected and interpreted through the human visual system it results in an object having a particular color. The most common way to capture spectral data with a device is by using a spectrophotometer.

FIG. 1(a) shows spectral reflectance of PANTONE process color inks as measured using an i1Pro spectrophotometer, from X-Rite Corporation, headquartered in Grand Rapids, Mich., USA. FIG. 1(a) also shows spectrum emitted by red LED illumination at or around 660 nm. FIG. 1(b) shows 931 CIE 2° standard observer matching functions used for converting spectral reflectance to CIE XYZ color space.

Often color is described by artists and designers in terms of mixing paint or inks. An artist often starts with white paper, which reflects most of the light. Different colored pigments are applied on top of the paper, which reduce the amount of light reflected back. Current trends for printing describe subtractive four color mixing using process color combinations of CMYK. Yellow, for instance, reflects most of the light, it absorbs only the lower wavelengths.

In 1931, the CIE (Commission Internationale de l'Eclairage) developed a way to link between wavelengths in the visible spectrum and colors which are perceived by the human visual system. The models which the CIE developed made it possible to transform color information between physical responses to reflectance in color inks, illuminated displays, and capture devices such as digital cameras into a perceptually (nearly) uniform color space. The CIE XYZ color space was derived by multiplying the color matching functionst with the spectral power of the illuminant and the reflectance of an object, which results in a set of XYZ tristimulus values for a given sample. Within the CIE model, CIE Y describes the luminance or perceived brightness. While the CIE X and CIE Z plane contain the chromaticities, which describes the color regardless of luminance.

Chromaticity can be described by two parameters, hue and colorfulness. Hue or hue angle, describes the perceived color name, such as: red, green, yellow and blue. Colorfulness is the attribute which describes a color as having more or less of its hue. A color with 0 colorfulness would be neutral. The CIE took the CIE XYZ space to propose a pseudo-uniform color space, where calculated differences are proportional to perceptual differences between two color stimuli, formally referred to as the CIE 1976 L*a*b* (CIELAB) color space. The L* coordinate represents the perceived lightness, an L* value of 0 indicates black and a value of 100 indicates white. The CIE a* coordinate position goes between "redness" (positive) and "greenness" (negative), while the CIE b* goes between "yellowness" (positive) and "blueness" (negative).

To describe how perceptually similar two colors are, the CIE developed a color difference model, CIE $\Delta E_{76}$. The first model developed was simply the Euclidean distance in CIELAB between two color samples. Since then, other more complex models have been developed to address some of the non-uniformity within the CIELAB Color-space, most notably the sensitivity to neutral or near neutral colors.

The CIELAB color difference metric is appropriate for measuring the color difference of a large uniform color region, however, the model does not consider the spatial-color sensitivity of the human eye. The luminance and chrominance CSF (Contrast Sensitivity Function) of the human visual system has been measured for various retinal illumination levels. The luminance CSF variation was measured by van Nes and Bouman (1967) and the chrominance CSF variation by van der Horst and Bouman (1969) and the curves are plotted in FIG. 2 for a single typical illumination level.

A digital watermark may contain signal energy over the spatial resolutions shown by the gray box in FIG. 2. If the luminance and chrominance contrast sensitivity functions are integrated over this gray box region, the resultant energy ratios calculate the uniform perceptual scaling for CIELAB L*, a* and b*. Thus the watermark perceptual error $\Delta E_{WM}$ can be calculated as:

$$\Delta E_{WM} = (\Delta L^2 + (\Delta a/8)^2 + (\Delta b/16)^2)^{1/2}, \quad (1)$$

where $\Delta L$ is the luminance variation and $\Delta a$ and $\Delta b$ the two chrominance variations introduced by a watermark.

Ink overprint models predict final color obtained by overprinting several inks on a specific press and substrate. These models can be used digital watermark embedding algorithm to predict (1) color of the overprint for visibility evaluation, and (2) color of the overprint as seen by the imaging device for signal robustness evaluation. Ink overprint models can be obtained in practice by combining two main factors (1) set of measured color patches printed on a real press, and (2) mathematical model interpolating the measured values while making some simplifying assumptions. One model can be obtained by measuring a set of color patches obtained by sampling the space of all possible ink combinations, possibly printed multiple times and averaged. For example, for kinks and n steps of each ink, $n^k$ color patches would have to be printed and measured. This process, known as press profiling or press fingerprinting, is often used with process inks, where a few thousand patches are used to characterize the press. Measured values are then interpolated and assembled into k-dimensional look-up table which is further consumed by software tools. ICC profiles are standardized and industry-accepted form of such look-up tables converting k ink percentages into either CIE XYZ or CIELAB space. For process inks, 4-channel CMYK profiles are standardized to maintain consistency between different printers. For example, the GRACoL ("General Requirements for Applications in Commercial Offset Lithography") specification includes CMYK ICC profiles recommended for commercial offset lithography. Unfortunately, full color spectral data is often not available as standardization is still in progress. This methodology quickly becomes impractical as spot colors are introduced due to exponential increase of the number of patches used to print and large number of spot colors available. A previous mathematical model for ink overprint was described by Neugebauer. For example, see, e.g., Wyble et al., "A critical review of spectral models applied to binary color printing," Color Research & Application, 25(1):4-19, 2000, which is hereby incorporated herein by reference in its entirety. The model expresses the spectral reflectance of a print as the sum of the reflectance of each combination of ink (called Neugebauer primaries) weighted by the relative proportion of the paper it occupies. For example, for spot ink S, Cyan, and Magenta, we have:

$$R(\lambda) = \alpha_0 R_0(\lambda) + \alpha_S R_S(\lambda) + \alpha_C R_C(\lambda) + \alpha_M R_M(\lambda) + \alpha_{SC} R_{SC}(\lambda) + \alpha_{SM} R_{SM}(\lambda) + \alpha_{CM} R_{CM}(\lambda) + \alpha_{SCM} R_{SCM}(\lambda), \quad (2)$$

where $R_0(\lambda)$, $R_C(\lambda)$, $R_{SC}(\lambda)$ is reflectance of substrate, 100% Cyan ink, and overprint of 100% spot and Cyan all printed on substrate at wavelength $\lambda$, respectively. Other overprints, such as $R_{SCM}$, are similarly defined. Weights $\alpha$ satisfy Demichel equation $$\alpha_0 = (1-\alpha_S)(1-\alpha_C)(1-\alpha_M) \ \alpha_M = (1-\alpha_S)(1-\alpha_C)\alpha_M$$
$$\alpha_{CM} = (1-\alpha_S)\alpha_C\alpha_M \ \alpha_S = \alpha_S(1-\alpha_C)(1-\alpha_M)$$
$$\alpha_{SC} = \alpha_S\alpha_C(1-\alpha_M) \ \alpha_{SMC} = \alpha_S\alpha_C\alpha_M, \ \alpha_C = (1-\alpha_S)$$
$$\alpha_C(1-\alpha_M) \ \alpha_{SM} = \alpha_S(1-\alpha_C)\alpha_M \quad (8)$$

where $\alpha_S$, $\alpha_C$, $\alpha_M$ is spot, Cyan, Magenta ink percentage, respectively.

In order to use the Spectral Neugebauer model with k inks in practice, there is typically a reflectance of $2^k$ Neugebauer primary colors including the color of the substrate, 100% of each ink on its own on the substrate, and all 100% ink overprint combinations printed on substrate. Reflectance of substrate, and any overprint of process inks can be derived (or at least approximated) from CIE XYZ values obtained from ICC profile. Reflectance of 100% of the spot color can be measured or taken from an external source such as PANTONE Live (www.pantone.com/live). Reflectance of multiple spot color overprint or process and spot ink overprint may be either measured from a printed test patch or, for transparent inks, approximated using product of reflectances. For example, reflectance of Cyan and spot color overprint can be approximated by:

$$R_{SC}(\lambda) = R_0(\lambda) \frac{R_S(\lambda)}{R_0(\lambda)} \frac{R_C(\lambda)}{R_0(\lambda)}. \quad (4)$$

Reflectance of process inks overprint can either be derived from an ICC profile CIE XYZ value or approximated as a product of individual reflectances normalized for substrate reflectance based on the formula above. When inks are approximated by Eq. (4), we obtain:

$$R(\lambda) = R_0(\lambda) \prod_{i=1}^{k} \left(1 - \left(1 - \frac{R_i(\lambda)}{R_0(\lambda)}\right)\alpha_i\right). \quad (5)$$

Coefficient $\alpha_i$ in Spectral Neugebauer model are linear ink percentages before any dot gain correction. From Demichel equation (3), linear ramp in $\alpha_i$ results in a linear change of reflectance and thus linear change of CIE XYZ. To correct for any single-ink non-linearity caused by the press (often called dot gain), we substitute $\alpha_i$ in the above model with gain-corrected values $g_i^{-1}(\hat{\alpha}_i)$. Function $g_i^{-1}$ inverts the dot-gain effect such that linear ramp in $\hat{\alpha}_i$ leads back to linear increase of reflectance. Several patches of single screened ink can be used to estimate $g_i^{-1}$ for i-th ink.

Further combinations, aspects, features and description will become even more apparent with reference to the following detailed description and accompanying drawing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1a is a diagram showing spectral reflectance of various PANTONE process inks as measured using an X-Rite i1Pro spectrophotometer. It also shows spectrum emitted by red LED at or around 660 nm.

FIG. 1b is a diagram showing a 1931 CIE 2° standard observer matching functions used for converting spectral reflectance to CIE XYZ color space.

FIG. 2a is a diagram showing a contrast sensitivity function of human eye (luminance, red-green, and glue-yellow), with plots of inverse of magnitude for luminance, red-green, and blue-yellow sine wave to become just noticeable to a human eye as a function of frequency.

FIG. 2b shows printing at different dots per inch (DPI).

FIG. 5a is an un-watermarked patch of spot color (PANTONE 221 C).

FIG. 5b is a watermarked version of the FIG. 5a patch, with modulating the spot color itself.

FIG. 5c is a watermarked version of the FIG. 5a patch, using CMY overprinting+a screened version of the FIG. 5a patch.

FIG. 5d shows min/max tweaks used to carry the watermark signal in FIG. 5b.

FIG. 5e shows min/max CMY overprint tweaks used to carry the watermark signal in FIG. 5c.

FIG. 6a shows a grayscale image as seen by a red LED scanner for the FIG. 5b patch; FIG. 6b shows a grayscale image as seen by a red LED scanner for the FIG. 5c patch.

FIG. 8a shows a grayscale representation of a watermark tile printed at 75 watermark pixels per inch; FIG. 8b shows a corresponding signal value histogram of the FIG. 8a tile.

FIG. 9 illustrates two (left and right) mid gray patches, with the left patch embedded using CMY tweaks, and the right patch using only Cyan tweaks.

FIG. 20b is a diagram showing distortion due to packaging corresponding to the designs in FIG. 20a.

Figure 3:
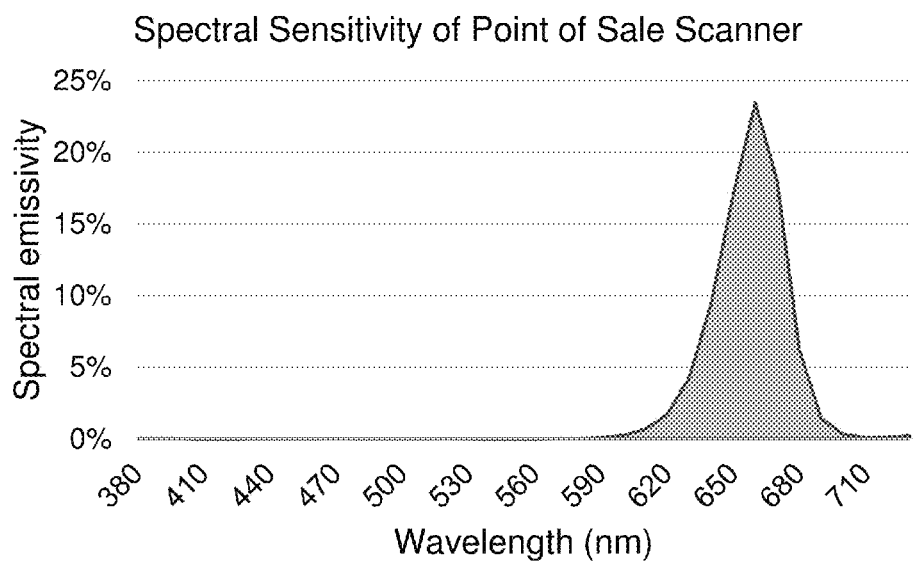
FIG. 3 shows spectral sensitivity of a Red LED scanner, with a peak at or around 660 nm.

Other drawings are included throughout the text in Appendix A, Reed et al., "Watermarking Spot Colors in Packaging," which is hereby incorporated herein by reference.

DETAILED DESCRIPTION

There are three (3) main sections that follow in this Detailed Description (I. Adaptive Embedding Framework, II. Spot Color and Process Color Data Hiding, and III. Additional Implementations and Description). These sections and their assigned headings are provided merely help organize the Detailed Description. Of course, description and implementations under one such section is intended to be combined and implemented with the description and implementations from the other such section headings. Thus, the section and headings in this document should not be interpreted as limiting the scope of the description.

I. Adaptive Embedding Framework

Portions of this disclosure are described in terms of, e.g., data hiding for product packaging (sometimes just referred to herein as "packaging" or "package") and other printed objects. These techniques can be used, e.g., to alter or transform how color inks are printed on various physical substrates. The alterations or transformations preferably result in a printed design carrying machine readable indicia. Such data hiding techniques may beneficially interrelate with the adaptive embedding framework below.

1. Design of Human Visual System (HVS) Models:

A human visual system model is used to indicate the extent to which changes to an image will be visible. While a watermark signal may be designed so that it is less noticeable by constructing the signal with less noticeable colors or spatial structure, the more sophisticated model analyzes the change in visibility relative to the host signal. Thus, a watermark embedding process should consider the extent to which the changes made to an existing image are visible. The host image may have little or no variation, or even no color content, in which case the visibility model assesses visibility of the watermark signal itself and produces output providing a measure of visibility. A watermark embedder function adapts the watermark signal amplitude, color and spatial structure to achieve a visibility target which depends on the application. For example, a fashion magazine would have a lower visibility target than packaged goods. The host image may have regions of color tones, in which case the embedder considers color errors introduced by the embedding process in those regions. In many cases, a host image includes regions with different color and spatial attributes, some uniform, others variable. In areas of the host image with variability, the changes due to embedding should be adapted to take into account not only visibility of a watermark signal, but in particular, visibility relative to the host signal, and its masking of changes due to the watermark embedding.

a. Watermark Signal Design:

The watermark signal is designed to be minimally visible within the types of host image content in which it will be embedded. This design includes selecting attributes like spatial frequency content and pseudorandom spatial patterns that tend to be less visible. Some examples of such implementations are described in U.S. Pat. No. 6,614,914, which is hereby incorporated by reference in its entirety. The watermark signal need not have random properties, however. It may have a regular or repeated pattern structure that facilitates robust detection and reliable data extraction as detailed in our application 62/106,685, entitled Differential Modulation for Robust Signaling and Synchronization, which is hereby incorporated by reference in its entirety. The watermark design also preferably leverages encoding in color channels to optimize embedding for visibility and robustness as described in US Published Application 20100150434, which is also incorporated by reference in its entirety.

b. Human Visual System (HVS) Models for Watermarking:

Prior work in HVS modeling provides at least a starting point for designing HVS models for watermarking systems. See, in particular, Scott J. Daly, "Visible differences predictor: an algorithm for the assessment of image fidelity", Proc. SPIE 1666, Human Vision, Visual Processing, and Digital Display III, 2 (Aug. 27, 1992); doi:10.1117/12.135952, and U.S. Pat. No. 5,394,483 to Daly, entitled, Method and apparatus for determining visually perceptible differences between images, which are hereby incorporated by reference in their entirety. Daly's HVS model addresses three visual sensitivity variations, namely, as a function of light level, spatial frequency, and signal content. The HVS model has three main components: an amplitude non-linearity function in which visual sensitivity is adapted as a non-linear function of luminance, a Contrast Sensitivity Function model of the eye that describes variations in visual sensitivity as a function of spatial frequency, and a model of masking effects. The first component is an amplitude non-linearity implemented as a point process. The CSF is implemented as a filtering process. The third in the sequence of operations is a detection process. The output is a map of the probability of detecting visible differences as a function of pixel location.

Daly used the HVS in U.S. Pat. No. 5,394,483 to develop a method of hiding one image in another image. See, U.S. Pat. No. 5,905,819 to Daly, Method and apparatus for hiding one image or pattern within another, which is hereby incorporated by reference in its entirety. Another HVS is described in U.S. Pat. No. 7,783,130 to Watson (also published as US Application Publication 20060165311), entitled Spatial Standard Observer, which is hereby incorporated by reference in its entirety.

In our prior work, we developed a perceptual masking model for watermarking that incorporates a CSF of the eye as well as a method for directional edge analysis to control perceptibility of changes due to watermark embedding around directional edges in a host signal. See U.S. Pat. No. 6,631,198, which is hereby incorporated by reference in its entirety.

We found that the Daly and Watson methods were useful but further work was needed for our watermarking techniques in color channels. Therefore, we developed HVS methods that incorporate color visibility models.

Our application Ser. No. 13/975,919 describes a full color visibility model for watermarking in color channels. U.S. application Ser. No. 13/975,919, entitled Geometric Enumerated Watermark Embedding for Spot Colors, issued as U.S. Pat. No. 9,449,357, are each hereby incorporated by reference in its entirety. One particular usage is watermarking in color channels corresponding to color inks used to print a host image. The watermark modulations of color values are modeled in terms of CIE Lab values, where Lab is a uniform perceptual color space where a unit difference in any color direction corresponds to an equal perceptual difference. The Lab axes are scaled for the spatial frequency of the watermark being encoded into the image, in a similar manner to the Spatial CieLab model. See, X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif., USA, June 1996, which is hereby incorporated by reference in its entirety.

This scaling provides a uniform perceptual color space, where a unit difference in any color direction corresponds to an equal perceptual difference due to the change made to encode a watermark signal at that spatial frequency. The allowable visibility magnitude is scaled by spatial masking of the cover image. This masking is computed based on a masking function. Examples of masking functions include the masking components of the Spatial Standard Observer model of Watson or the HVS models of Daly referenced above, as well as our prior patents, such as U.S. Pat. No. 6,631,198 and U.S. Pat. No. 6,614,914, referenced above.

Relatedly, our application Ser. No. 14/588,636, describes techniques for embedding watermarks in color channels that employ full color visibility models. Patent application Ser. No. 14/588,636, entitled Full-Color Visibility Model Using CSF Which Varies Spatially with Local Luminance, and which issued as U.S. Pat. No. 9,401,001, are each hereby incorporated by reference in its entirety. This approach uses a full color visibility model for watermarking in color channels. This visibility model uses separate CSFs for contrast variations in luminance and chrominance (red-green and blue-yellow) channels. The width of the CSF in each channel is varied spatially depending on the luminance of the local image content. The CSF is adjusted so that more blurring occurs as the luminance of the local region decreases. The difference between the contrast of the blurred original and marked image is measured using a color difference metric.

The luminance content of the host image provides potential masking of changes due to watermarking in chrominance as well as luminance. Likewise, the chrominance content of the host image provides potential masking of changes due to watermarking in luminance as well as luminance. In our watermarking systems that embed by changes in luminance and chrominance, or just chrominance, of the host image, the embedding function exploits the masking potential of luminance and chrominance content of the host image. The masking potential at a given region in an image depends in part on the extent to which the host image includes content at that region that masks the watermark change. For example, where the watermark signal comprises mostly high frequency components, the masking potential of the host image is greater at regions with high frequency content. We observe that most high frequency content in a host image is in the luminance channel. Thus, the luminance content of the host is the dominant contributor to masking potential for luminance changes and chrominance changes for high frequency components of the watermark signal.

In some applications, the watermark signal has lower spatial frequency content, and the embedding function computes the masking capability of that low frequency content on the watermark signal as well, taking into account both luminance and chrominance masking on luminance and chrominance components of the watermark signal.

Our watermarking techniques in luminance and chrominance channels also leverage masking of spatial structure particular to those channels. Such visibility effects originate both from the host image as well as the print technology. The host image content can have strong spatial frequencies at an angle, which masks similar spatial structure of the watermark at that angle. Likewise directional edges in the host image control watermarking along the edge as noted in U.S. Pat. No. 6,631,198.

The print technology sometimes prints with halftone screen or raster for different inks with different orientation, shape, and structure. Black inks, for example, are sometimes printed with halftone dots at screen angle of 45 degrees to achieve a higher print quality because black is most noticeable to the eye and it is desirable to make the spatial pattern of black dots less noticeable. These types of print structures for different color inks provide an opportunity to hide the watermark signal differently in the color channel or channels that correspond to that ink. For more on watermarking that exploits the halftone structure and Raster Image Processor used in printing, please see our US Patent Publication 2014-0119593, which is hereby incorporated by reference in its entirety.

2. Robustness Modeling:

Optimizing the embedding for robustness adds another constraint in which the encoding is controlled not only to achieve a desired visual quality, but also to achieve reliability in decoding the watermark. A simple view of robustness may be to set a floor on the gain or signal level of the watermark signal, but this is potentially less useful if it does not consider how well watermark signal structure is maintained within a host image, or opportunities to apply less gain where signal structure is maintained due to attributes of the host image that are inherently better at carrying data with less or no modification. A more sophisticated view is to consider how the watermark signal conveys data through its color and structure or the color and structure created when it exploits host signal structure to mask watermark variations and/or carry data (e.g., where signal data is encoded in the relationship among values or an attribute derived from a region in an image, how is that relationship or attribute impacted by modifications made to reduce visibility?) Thus, controlling the strength of the watermark signal should also ensure that such control does not undermine its reliability. A robustness metric can be designed based on readability of the watermark, e.g., through a detection metric: modification of the signal to remain within a visibility constraint should maintain the structure of the signal that conveys digital data. Our application Ser. No. 13/975,919 describes a framework for watermark embedding that optimizes embedding based on visibility and robustness models. See Appendix A of Ser. No. 13/975,919: Bradley, Reed, Stach, "Chrominance watermark embed using a full color visibility model."

3. Modeling the Distortion of the Channel:

Related to robustness optimization, the embedding process should take into account the impact of anticipated distortion introduced by printing, use or scanning of the printed object. A particular concern is the extent to which a change to embed an image will become more visible due to the technology used to render the image, such as the display or printer. This type of rendering distortion may be incorporated into the model to predict the change in visibility and/or robustness after distortion, and adjust the embedding to compensate for this change. Likewise, the rendering distortion may also impact robustness. As such, robustness modeling should account for it as well.

See in particular, our U.S. Pat. No. 7,352,878, which describes a model that incorporates a model of the rendering device (e.g., display or printer) within an adaptive embedding function. The embedder uses this model to adapt the visibility mask used to control the watermark signal, so that it takes into account the effects of the rendering device on visibility. U.S. Pat. No. 7,352,878 is hereby incorporated by reference in its entirety. These techniques may be further combined with full color visibility models and robustness models referenced in this document.

Other examples of modeling distortion include adding noise, applying a geometric distortion, compressing the image, and modeling image capture distortion. For package images to be printed on a 3D object with known shape, the geometric distortion applied to the image is known and its effect can be compensated for in the embedding of the watermark in the package design. Examples include labels wrapped around a curved object (e.g., a yogurt cup or soup can). The watermark signal (and in some cases the host signal itself) may be pre-distorted to compensate for the geometric transformation caused by application of it to the object. This and other noise sources may be modeled and applied to the watermarked image to measure its reliability in the robustness model. The watermarking process is then corrected or iterated as necessary to achieve reliable detection metrics.

4. Printing Technology Limitations:

Another related constraint is the limitation of the print technology. As noted, it may cause distortion that impacts visibility and robustness. It may have limitations in the manner in which it is able to represent a color or spatial structure of the watermark signal. It may not be able to print a particular color, dot structure, orientation or size/resolution, or may introduce registration errors among different ink layers that make encoding in color directions not viable. Distortion due to dot gain and other limitations of replicating an image on a substrate need to be accounted for. Dot gain distortion can be modeled in the robustness model such that the watermark signal is embedded to be robust to the distortion.

5. Image Capture Device Limitations:

Another design consideration is the image capture device. Some forms of image capture devices, such as barcode scanners, do not capture full color images. For example, some barcode scanners have monochrome image sensors and illuminate an object with red LED illumination. This type of limitation requires that the watermark signal be designed so that it can be "seen" by the capture device, meaning that at least a portion of the watermark signal is readable in the spectral band or bands captured by the image sensor. We discuss these limitations and methods for addressing them in our US Application Publication 2013-0329006 and U.S. Provisional Application 62/102,247, which are hereby incorporated by reference in their entirety.

6. Color Appearance and Attention Models:

Attention (also referred to as "saliency") models may also be included to adjust visibility model for controlling watermark modification at a particular location within an image. See our U.S. patent application Ser. No. 14/588,636 for description of how to use this type of model in a watermark embedder. An attention model generally predicts where the human eye is drawn to when viewing an image. For example, the eye may seek out flesh tone colors and sharp contrast areas. One example attention model is described in Itti et al., "A Model of Saliency-Based Visual Attention for Rapid Scene Analysis," IEEE TRANSACTIONS ON PATTERN ANALYSIS AND MACHINE INTELLIGENCE, VOL. 20, NO. 11, November 1998, pgs. 1254-1259, which is hereby incorporated herein by reference in its entirety. High visual traffic areas identified by the attention model, which would otherwise be embedded with a relatively strong or equal watermark signal, can be avoided or minimized by a digital watermark embedder, e.g., through adjustment of the visibility map used to control application of the watermark signal to a host image. In many application scenarios, it is advantageous for the embedding system to take into account a Color Appearance Model (CAM) to assess the extent to which a change in color is likely to be noticeable relative to colors present in the host image. For information on CAM, please see Fairchild, Mark D. Color Appearance Models. Chichester: John Wiley & Sons, 2013. Our application of digital watermarking in packaging provides methods in which CAM is automated and applied in embedding functions for advantageous effect.

Package designs typically include colors for which the package designer attaches importance over other colors. For example, a consumer product brand may have a color or combination of colors that are strongly associated with the brand. The designer, thus, seeks to achieve consistency and accuracy in representing this color across all of its packages. This may be achieved through the use of a spot color. Another example is where the designer selects a particular color or color combination to evoke a particular theme for the product (e.g., a pineapple flavored product might use a yellow color). This color might be modified by the watermark, but the modification should not undermine the intent of the designer, nor appear objectionable to the consumer. Finally, the remaining colors on package may be less important, and thus, more available for modification. Among these parts of the package design, there may be regions in which a tint may be applied to convey the digital watermark or the host image may be modulated in a particular color or set of colors. Overall, none of the image should be modified in a manner that undermines the designer's objective for the dominant brand colors, or an important thematic color.

To illustrate, consider an implementation of adaptive watermark embedding in a plug in of a design program used for designing the package image. The plug in allows the designer to specify importance of colors, which in turn, dictates whether the plug in will modify a color, and if so, the extent to which the modification are allowed to deviate from the original color. For the colors in a design, the CAM takes their priority and provides constraints for color modifications that are applied in the embedding function. The color match error for use of a substitute color for an original color (e.g., process inks for spot color) and the color error introduced by the watermark are weighted according to the priority of the color. Additionally, the CAM places a constraint on the direction in color space of the modification to a particular color. The following examples will illustrate.

If a bright background area is available for conveying a data signal, the CAM detects the bright area by their pixel values and provides specification for the tint used to fill that area that satisfies the CAM constraint relative to the color of other features in the design. This bright background is intended to look white or nearly white and a light tint added to it will not be noticeable so long as it is uniform in the design and not modulated in a color direction that is incompatible with the color of neighboring features. So long as the area covered by the tint remains substantially brighter than the rest of the design elements, it will not be noticeable. It would only be noticeable if it were positioned next to a blank area with no tint. The CAM constraints preclude noticeable changes of appearance of regions and can also be set so that the modulation of such areas are smoothly tapered near regions with other colors of higher importance.

Another example is a package design where there is a thematic color for which the CAM limits the direction of color modulation or alternatively specifies a black tint to convey the watermark signal. The example of the yellow for a pineapple product is appropriate to illustrate. For such a case, the CAM takes the priority weighting for the yellow and further constrains the modulation color direction to preclude objectionable color changes within the yellow region of the package. Green is an example of a color that would be incompatible and thus precluded by the constraint set by the CAM for the yellow region of the design. Alternatively, the embedder substitutes a black ink tint if a robustness measure indicates that a reliable signal cannot be achieved in allowable chrominance modulation directions or channels.

II. Spot Color and Process Color Data Hiding

A significant number of packages in commerce are printed to include at least some areas using "spot colors" as discussed above. Spot colors may include, e.g., custom pre-mixed ink designed to achieve a certain color when printed on a specified substrate. PANTONE is one example of a spot color system that is commonly used in the product packaging industry. Packages may also include so-called process colors. As discussed above, process colors typically refers to Cyan (C), Magenta (M), Yellow (Y) and/or Black (K) inks that are used to simulate a wide range of colors by mixing these various inks on a substrate. Process colors can be printed with, e.g., half tone dots.

Data hiding within a spot color can be challenging since the spot color can be viewed as a flat patch, with little or no variance. Modulating a flat color patch to carry an information signal may introduce color shifts and noticeable visible artifacts. Also, many package designers use spot colors to achieve a distinctive color. Altering a specific spot color may result in aesthetic complaints from the designers and deviation for the distinctive color.

This disclosure provides, e.g., methods, systems, software plugins and applications, and apparatus for hiding information in spot colors and other color areas while minimizing color shifts and visibility concerns. In some cases we prefer to hide data in spot colors in a chrominance domain rather than with luminance to reduce the visibility of the hidden data.

Figure 12:
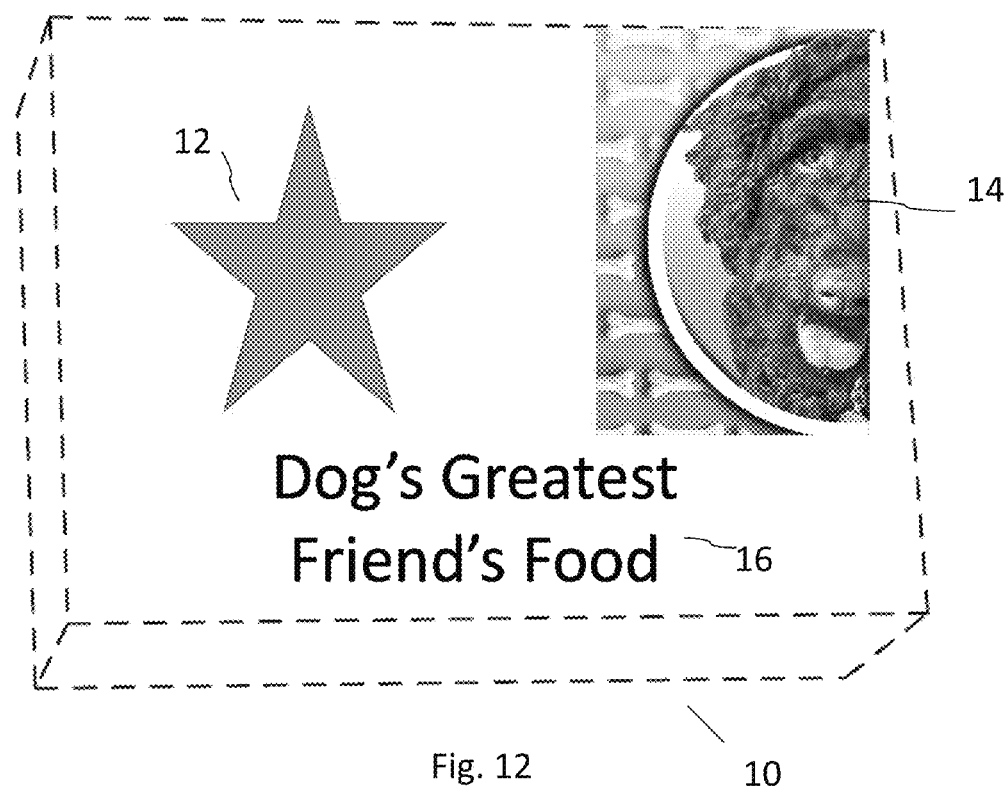
FIG. 12 depicts a product package including multiple different areas, the different areas including different data hiding therein.

With reference to FIG. 12, a product package 10 may include multiple different printed areas 12, 14, 16. Area 12 may include spot color ink, area 14 may include one or more process color inks and area 16 may include printed text. Package 10 may include multiple different forms of data hiding to convey machine-readable indicia over a substantial portion of the package. For example, the area 12 spot color may be screened and then overprinted with CMY process colors to covey a watermark signal, the area 14 may already include process colors, which can be modulated to convey an information signal. For area 16 (and any white spaces) a subtle tint of CMY(K) may be printed which includes an information signal. The information signals in theses area preferably include overlapping (or the same) information such that the information signal can be obtained from signal detection in one or more of the areas 12, 14, 16. In fact, for many package designs we prefer to redundantly embed an information signal over substantially all package surfaces (e.g., 80-100% coverage).

One form of an information signal used to guide embedding can be a robust spread spectrum digital watermark signal. One instance may carry a plural-bit payload, e.g., a 47-bit payload, enough to encode the same information as is carried in a Global Trade Item Number (GTIN-14) often found in a linear UPC barcode. A watermark payload may also include additional error correction bits, checksums, payload version bits and other information. A watermark carrying a specific payload can be represented, e.g., at a spatial resolution of 75 DPI, as a 128×128 pixel grayscale image, called a watermark tile. FIG. 8a shows one instance of a watermark tile with a histogram (FIG. 8b) of watermark signal values. Of course, different instances of watermarking and other types of machine-readable indicia can be used instead of the illustrated watermark tile. In the illustrated case, the watermark tile includes a zero-mean signal with positive and negative values referred to as "waxels" (e.g., watermark pixels). Watermark tiles can be concatenated next to each other to cover larger area. As opposed to a traditional UPC barcode, portions of a single watermark tile can be cropped and still successfully be decoded due to its repetitive structure. When print resolution is different from 75 DPI (e.g., see FIG. 2, shaded area), the watermark tile can be up-sampled to match the print resolution.

Figure 4:
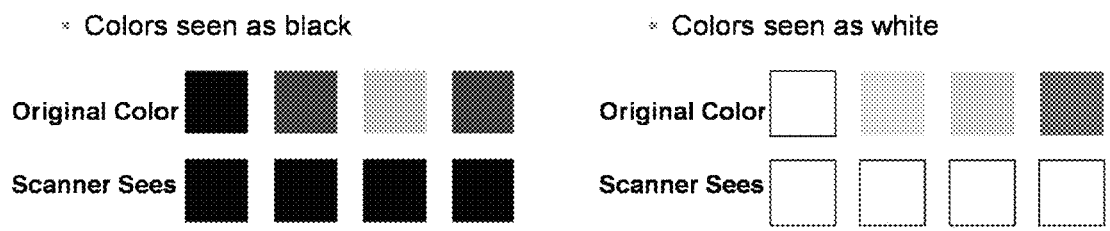
FIG. 4 shows various colors and their grayscale representation ("scanner sees") as seen by a POS scanner with a 660 nm red LED illumination.

Point of Sale (POS) scanners with red LEDs typically include a narrow-band monochromatic imager with a peak response at or around 660 nm. Such red LED scanners are often found at grocery checkout lanes, looking for traditional UPC barcodes. See FIG. 3 for a spectral response of a typical red LED capture device; see also FIG. 1a. A red LED capture device (e.g., a point of sale scanner or camera) only "sees" colors which reflect at or around 660 nm. If a color strongly reflects at this wavelength the captured device 'sees' white. Bright yellows, magenta, pink, orange and white are all 'seen' as white by a red LED capture device. If a color has a low reflection at this wavelength (e.g., absorbs the wavelength) the captured device "sees" black. Dark blue, Cyan, green, purple and black are all 'seen' as black by the camera. FIG. 4 illustrates these arrangements. Thus, changes made to colors of low spectral reflectance at or around 660 nm are visible (e.g., register as black pixel values) to the scanner and thus are suitable for carrying information signals. Due to the combination of a narrow-band illumination and monochromatic sensors, a typical barcode scanner can only see grayscale images created by spatial changes in ink reflectance at 660 nm. If more inks are overprinted, the grayscale value G can be obtained from a 660 nm component of the Spectral Neugebauer model as:

$$G = \text{sensitivity} \cdot R(660 \text{ nm}) + \text{offset} \quad (6)$$

Two approaches are now considered when introducing an information signal into a spot color. With reference to FIG. 5a, FIG. 5b and FIG. 5d, a first approach modulates the spot color itself (FIG. 5a). Max (FIG. 5d, left patch) and Min (FIG. 5d, right patch) tweaks (e.g., pixel or color changes, color value amounts, and/or signal or color channel modulations or modulation changes) are determined to carry a signal. The Max patch can be a 100% version of the spot color, and the Min patch can be a screened back version of the spot color (e.g., 85% screen). The min/max tweaks are substituted for (or interpolated according to an information signal) the original spot color values across the spot color patch according to an information signal, e.g., the original signal is modulated with the min/max tweaks to convey the information signal.

A second approach uses CMY min and max tweaks (See FIG. 5e) as a tint applied (e.g., printed) over a screened back version of the spot color in FIG. 5a. The resulting watermarked patch (see FIG. 5c) is a closer approximation to FIG. 5a relative to FIG. 5b. Thus, an information signal can be conveyed through a CMY tint in a combined screened spot color+process colors. The combined screened spot color+process colors are provided to approximate the original spot color. CMY tweaks or signal modulations can be added with a tint over (or, in some cases, beneath) a spot color screen. As discussed above, the term "screen" implies that a spot color is scaled back or reduced, e.g., in terms of its color percentage or chrominance values. Watermark tweaks (ΔC, ΔM, ΔY) can be provided to achieve a scanner signal, ΔGRAY, as seen by a monochrome scanner. One optimization combines a CMY tint including min (e.g., negative) and max (e.g., positive) watermark signal tweaks that combine to approximate an original spot color.

FIG. 6a and FIG. 6b presents a red LED capture device grayscale view point of the FIG. 5b and FIG. 5c embedded patches. The detectable signals from each patch are very similar in terms of standard deviation, 2.2 (FIGS. 6a) and 2.1 (FIG. 6b). Yet the improvement in visibility reduction in FIG. 5c vs FIG. 5b is tremendous. This points to an advantage of the combined screened spot color+process color tint.

This second approach is described even further below with respect to FIG. 7. See also Appendix A, Reed et al., "Watermarking Spot Colors in Packaging," which is hereby incorporated herein by reference in its entirety, for a related disclosure.

Figure 7:
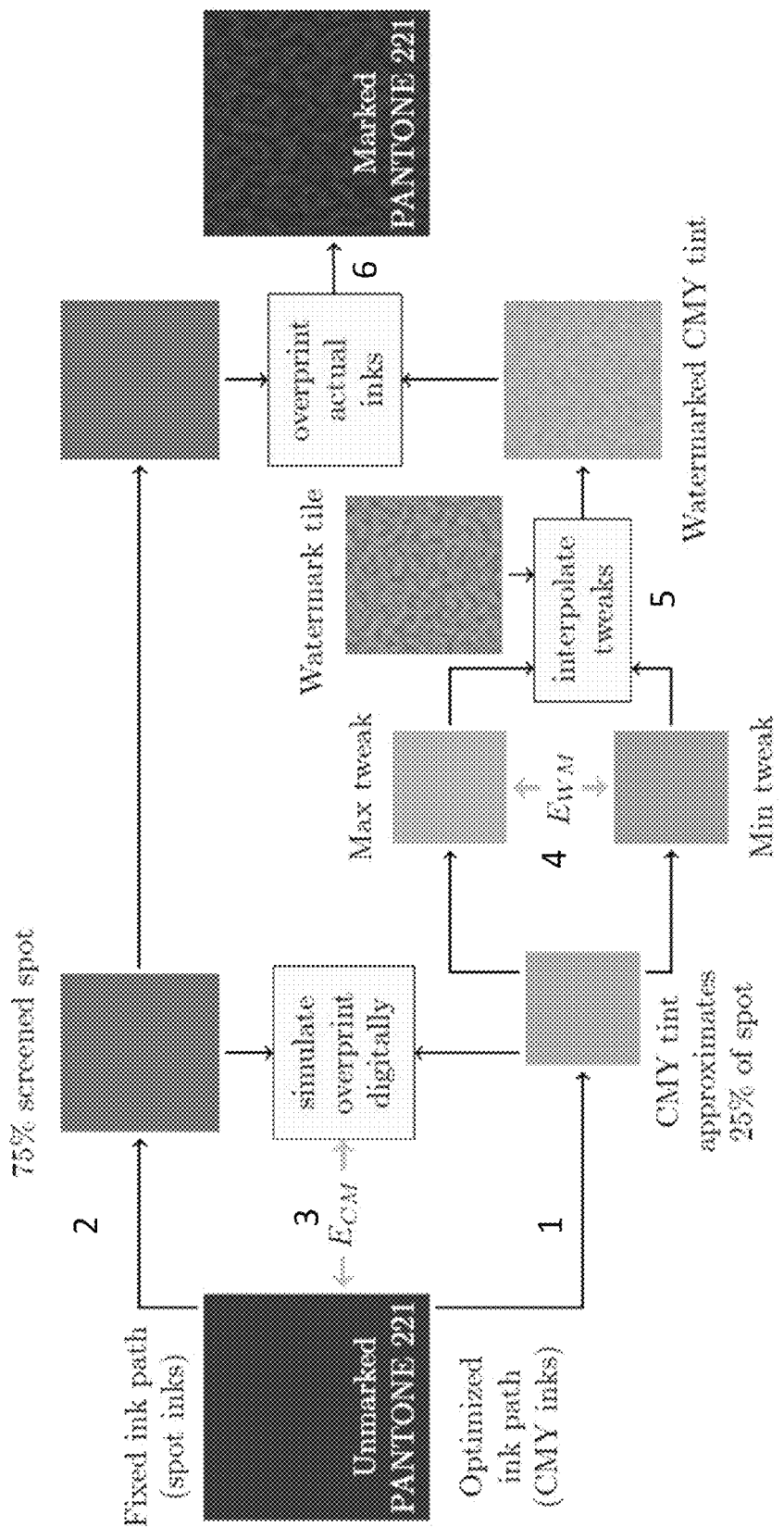
FIG. 7 is a diagram showing a spot color data hiding process using CMY overprints.

With reference to FIG. 7, an embedding process is shown relative to an un-watermarked spot color, PANTONE 221 C. The below numbered 1-6 paragraphs correspond to numbers 1-6 in FIG. 7.

1. Determine CMY values for overprinting with a screened spot color. The combined screened spot color+ process colors (CMY) are provided to approximate the original spot color. We generally use the term "tint" to refer to the selected CMY process colors. The CMY approximation or tint can be determined by testing, or models of overprinting can also be used as discussed, e.g., in Deshpande, K. and Green, P. "A simplified method of predicting the colorimetry of spot colour overprints," 18th Color Imaging Conference: Color Science and Engineering Systems, Technologies and Applications, pg. 213-216, San Antonio, USA 2010, which is hereby incorporated herein by reference in its entirety. Or, for a given substrate, a PANTONE ink swatch can be scanned with a spectrophotometer to determine corresponding process color (or L*a*b*) correspondence. Libraries, table and/or indices of such approximations, predictions or measurements can be built for rapid consultation. Interpolation can be employed to estimate process color tint percentages for values not explicitly represented in the table. For example, a table or library can be accessed to find CMY values, which when combined with a screened back version of a particular spot color, will yield a close approximation to the original spot color.

2. Screen spot color. Screening provides information signal headroom for an over (or under) printed CMY tint. Recall from above that the CMY tint will carry the information signal. An amount of screening may depend, e.g., at least in part on an amount of cyan absorption associated with the original spot color. In the illustrated PANTONE 221 example, the spot color is screened to 75%. Of course, this percentage screen is not limiting as other percentages may be chosen based on, e.g., visibility, robustness and masking considerations. For this example, it was determined that a color approximation of the illustrated PANTONE 221 spot color in terms of percent (%) spot, C, M and Y: 75%, 13, 57, 8.

3. Simulate the CMY overprint+screened spot color to evaluate color match error ECM between the original spot color and the CMY overprint+screened spot color. This process can be used to iterate selection of the CMY tint values to minimize error of the selected process colors and screen. For example, $\Delta E_{76}$, $\Delta E_{94}$, $\Delta E_{2000}$, metrics can be used to minimize color error between the process color tint+screened spot color and the original 100% spot color. Different screen percentages and CMY tint values at or around the predicted colors can be investigated to find values with minimized error.

4. Decompose CMY tint into Min and Max Tweaks. For example, a gradient search process or least squares distance process can be conducted to find optimum tweaks. These processes may consider other factors as well. For example, an optimization process may consider the original spot color, visibility constraints, robustness requirements at a particular spectral response (e.g., at 660 nm), a k (black) channel, other spot colors, etc. For the illustrated example, Min Tweak (%): 75, 27, 42, 16; and Max Tweak (%): 75, 0, 73, 0 were determined. In FIG. 7, $E_{WM}$=watermark error, which can be a weighted sum of $\Delta L^*$, $\Delta a^*$ and $\Delta b^*$ where CIE $\Delta L^*$ can be weighted heaviest to account for greater visibility of the watermark signal in lightness, followed by $\Delta a^*$ (red-green) and then $\Delta b^*$ (yellow-blue). Some goals of the Min and Max CMY Tweak may include, e.g., i) similar perceived visibility to original spot color when overprinted with screened spot, ii) maximum tweak difference at 660 nm (corresponding to red LED scanner), which maximizes scanner visibility; iii) minimum luminance (CIE L*) difference, recall that human visual system is most sensitive to luminance changes and color difference (CIE a* and b*) should be kept under control.

5. Embed an information signal by spatially and variously changing some or all of the CMY tint between Min and Max tweaks. The tweaks can be used to modulate or transform the CMY tint to convey an information signal. An information signal (e.g., as carried by a watermark title in FIG. 7) can be embedded into CMY tint by interpolating between min and max tweaks based on watermark tile values. For example, the following equation can be used to interpolate tweak values for a given pixel or area value: $T_{CMY}=T_{Min}+(1+W)(T_{Max}-T_{min})/2$, where W is a grayscale value of the watermark tile at a certain location and Tmin and Tmax are the min CMY tweak and max CMY tweak values, respectively. The result of this process for each watermark title value yields a modulated (e.g., watermarked or embedded) CMY tint. Of course, other types of encoding besides digital watermarking can be used to guide embedding of the CMY tints. For example, 2D barcodes, UPC barcodes, and other types of machine readable indicia, can be used to guide construction of an information signal to be hidden or embedded via CMY tint.

6. The modulated CMY tint is overprinted on the screened back spot color to yield a marked or embedded spot color.

Additional color blending, signal considerations, embedding and tweak value determination details, etc., are discussed below.

When embedding an information signal like a watermark tile into artwork, visibility of the embedded information signal as observed by a human user is often balanced with watermark robustness when scanning a package. Based a scanner response under red LED illumination shown in FIGS. 3 and 4, ink changes printed in Cyan or Black are visible to the scanner and thus can be useful for carrying an information signal. The human visual system, however, is significantly more sensitive to luminance changes (e.g., caused by changes in black ink) than chrominance changes (e.g., caused by changes in cyan ink). To reduce human visibility a watermark tile can be embedded by modifying each of the C, M, Y channels with grayscale values of the watermark tile W weighted by elements of the unit-length color weight vector $\omega=(\omega_C, \omega_M, \omega_Y)$ and global signal strength σ:

$$C_i^1 = C_i + \sigma\omega_C W_i, \quad M_i^1 = M_i + \sigma\omega_M W_i, \quad Y_i^1 = Y_i + \sigma\omega_Y W_i, \quad (7)$$

where index i denotes the pixel of each color separation. Color weights ω drive the color of watermark signal, while σ changes the overall strength of the signal. Both parameters influence the visibility of the watermark.

In general, the color weights ω may be associated with an ICC color profile for CMYK artwork which captures the color of CMYK ink overprints. For a typical GRACoL profile, the color weights can be set to, e.g., $ω_{GRACoL}$ for CMY=(0.69, −0.61, 0.39). Even though a red LED capture device does not see magenta and yellow changes, non-zero weights can be chosen to help minimize luminance changes introduced by embedding the watermark signal in Cyan. FIG. 9 shows sample patches embedded with this method. The left patch in FIG. 9 shows a watermark tile embedded in a mid-gray patch using the color weights mentioned in this paragraph. The right patch in FIG. 9 shows the same watermark tile embedded in the mid-gray patch with only changes introduced in a Cyan channel. The Cyan only patch (right patch) is visibly "grainy" or "noisy" compared to the chrominance (left patch, CMY embedded) patch.

Due to spectral dependency of a red LED capture device, only an information signal embedded in Cyan separation is available to the detector because signal in Yellow and Magenta are not seen by the capture device. In case of the $ω_{GRACoL}$ color weights mentioned above (0.69, −0.61, 0.39), this only represents about $0.69^2$=48% of the total signal energy embedded in the artwork that is extracted by a captured device. If a full-color image sensor is available, such as in a smart phone, the embedded watermark signal present in all CMY plates can be combined by aligning a grayscale conversion weight W:

$$G = \text{sensitivity} \cdot \sum_\lambda w(\lambda) R(\lambda) + \text{offset} \quad (8)$$

In RGB color space, this grayscale conversion can be approximated as 0.52·R−0.81·G+0.29·B.

When a CMY ink combination is overprinted with Black (K) to produce darker colors, the Black ink may act like an optical filter and reduce magnitude of changes introduced in Cyan separation. This may lead to a weaker watermark signal as seen by a red LED scanner and thus the robustness of the watermark can be degraded. This loss can be compensated either by increased signal strength a, or by replacing a portion of the Black ink with a CMY combination making the final CMYK mix more suitable for watermarking, e.g., using a process known as Under Color Addition. Colors with either no or 100% Cyan component pose another challenge. If Eq. 7 is applied blindly, half of the waxels may not be embedded due to clipping resulting in a robustness loss. This could be resolved by compressing the color gamut of the artwork. For example an image with no Cyan, 2%-4% Cyan ink can be added in the original design. A watermark can then be inserted in this pre-conditioned artwork using methods described above.

Figure 10:
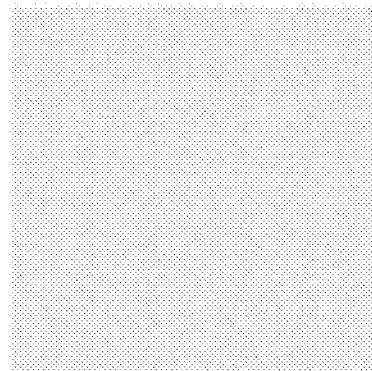
FIG. 10 illustrates two tints that can be used for marking white, text based or open spaces. The left tint includes a cyan, magenta and yellow inks whereas the right patch only includes cyan.
Figure 10:
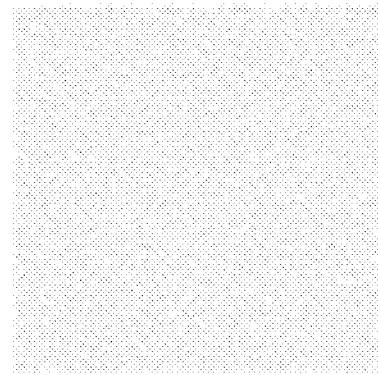

In order to utilize the full potential of digital watermarking for product packaging, a large portion of the package surface can be watermarked (e.g., 80-100%). That is, a package may include many redundant instances of an information signal hidden therein. Some packages contain significant areas without any ink coverage. Such areas may lead to dead zones and reduce the full benefit of improved checkout speed. To resolve this, white areas can be covered by a light CMY tint which is can be modulated prior to printing to carry information signals. Tint including 4% C, 2% M and 2% Y can be used for offset printing white, open or behind text areas. An example of this tint is shown in FIG. 10, where the left patch includes the suggested 4% C, 2% M and 2% Y tint, and the left patch includes just cyan only.

When embedding a watermark in complex artwork, not just flat spot color areas as is the one of the focuses of FIG. 7, more signal can be embedded in textured areas than in flat regions because image texture masks the presence of the watermark signal. To better utilize this effect, both direction of the color weight vector and signal strength may vary spatially to equalize visibility of the watermark. This can be done either manually in image editing software or automatically as discussed in Reed et al., "Full-color visibility model using CSF which varies spatially with local luminance." In Q. Lin, J. P. Allebach, and Z. Fan, editors, Proceedings SPIE 9027, Imaging and Multimedia Analytics in a Web and Mobile World 2014, volume 9027, 2014, which is hereby incorporated herein by reference in its entirety. Similarly, form factor of a package may indicate that the signal strength to be increased. For example, the area of a soda can is significantly smaller than that of a cereal box. Larger objects provide more opportunities for a capture device to successfully read a hidden signal. So the soda can may have a signal strength that is stronger relative to the cereal box. Similarly, the geometry of a package may dictate increased signal strength. For example, curved surfaces and near corner areas (e.g., packaging for a can of soup or corner of a package, etc.) may warrant a stronger signal strength. 3D models or user defined areas can be used to identify corner areas for increase signal strength, or for curved surfaces, the signal strength across the entire surface can be increased.

Returning to the spot color embedding discussed relative to FIG. 7, the color difference between 100% spot and the screened 75% with overprinted CMY tint, denoted as ECM, can be referred to as Color Match Error and can be measured using various color difference metrics as mentioned above. The CMY tint can be decomposed into so-called Max and Min Tweaks by, e.g., minimizing weighted color difference between them while achieving a detectable difference in spectral reflectance at 660 nm when overprinted with the screened 75% spot color.

Color difference between min and max tweaks overprinted with 75% spot, denoted $E_{WM}$, is called Watermark Error. A final watermark can be produced by overprinting 75% screened spot and the modulated CMY tint. In this process, both color errors are interconnected. In order to keep luminance changes minimal more space for CMY tweaks can be used and thus, possibly, increasing the color match error, ECM. A spot screen of 75% is also a parameter that could be changed. Difference of spectral reflectance at 660 nm, denoted as $\Delta_{660}$, serves as a measure of watermark signal strength similar to parameter a in Eq. (7). Given a value of $\Delta_{660}$ spectral ink overprint models can be used to find optimal value of spot screen and min and max tweak ink percentages minimizing weighted sum of both color errors:

$$\min_{\alpha_{min}, \alpha_{max}} E_{CM} + p \cdot E_{WM} = \quad (9)$$

$$\Delta E_{76}\left(R_S, \frac{R_{max} + R_{min}}{2}\right)^2 + p \cdot \Delta E_{WM}(R_{min}, R_{max})^2$$

s.t.

$$R_{max}(660) - R_{min}(660) \geq \Delta_{660}$$

$$0 \leq \alpha_{min}, \alpha_{max} \leq 1$$

where $R_{max}$ and $R_{min}$ correspond to Neugebauer spectral reflectance from Eq. (2) obtained for (spot and CMY) ink percentages $\alpha_{max}$ and $\alpha_{min}$, respectively. $R_S$ refers to spectral reflectance of the original spot color printed on a substrate. Color difference metrics $\Delta E_{76}$ and $\Delta E_{WM}$ are discussed above. Both metrics can be configured to return scalar values weighted by a constant penalty term p. In general, weight p is dependent on the color. From experiments conducted with professional designers, we now prefer to set the default value of the weight factor to p=1. Of course, varying p may result in additional or less signal detection robustness.

By formulating data hiding as an optimization problem, other printing press or design-related constraints can be put in place. For example, designers may not allow a spot color ink to be screened due to physical press reasons, or may limit the amount of screening. By including the spot ink in $\alpha_{min}$ and $\alpha_{max}$ without any constraint will allow the spot ink to be modulated by the watermark tile. For example, a specific spot ink is moved from the fixed-ink path in FIG. 7 to the optimization path and is included in the optimization process along with CMY inks. Min and max tweaks then may include a spot ink component and the watermark tile can be embedded by interpolating between these two colors as described previously for the CMY case.

The optimization problem in Eq. (9) can be solved numerically with, e.g., the IPOPT library, using the underlying technology detailed in A. Wachter and L. T. Biegler, "On the implementation of a primal-dual interior point filter line search algorithm for large-scale nonlinear programming." Mathematical Programming, Vol. 106, issue (1): pages 25-57, 2006, which is hereby incorporated herein by reference in its entirety. IPOPT code is available as open source, e.g., at bitp://www.coin-or.org/Ipopt.

Such an optimization can be carried out for a given image area, e.g., a spot color area have the same color values. Additionally, the optimization can be carried out for each image area including different color values. This might include optimizing an entire image or image area on a per pixel basis, or on an area by area basis.

Figure 11:
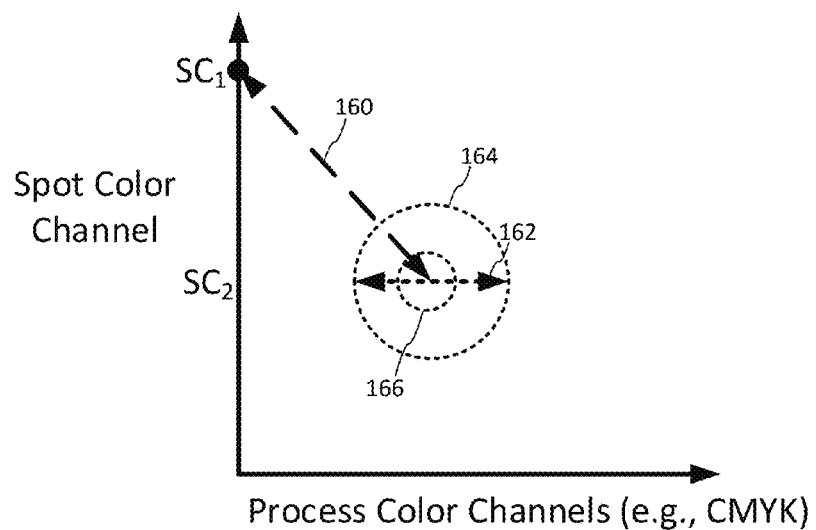
FIG. 11 is a diagram showing optimization tradeoffs when selecting a screened spot color and corresponding process colors.

FIG. 11 provides a graphical framework to consider some aspects of our color embedding optimization technology, e.g., as previously discussed relative to FIG. 7. SC1 represents a first color. To generalize an optimization system, there can be at least 3 components: i) system space, ii) variables to optimize, and iii) system constraints. In one implementation the space may include a color gamut defined by a first color channel (SC channel) and four process colors CMYK. Of course, the space may include additional color channels, e.g., two or more spot colors. In this implementation, the variables to optimize may include, e.g., eight (8) or more variables, e.g., SC2, CMY tint and ACMYK. The constraints may include, e.g., bounding features, ink properties, printer properties, use, package form factor (e.g., 3D model), detection criteria, performance standards and/or system limitations.

Returning to FIG. 11, SC1 could be a 100% value of a certain spot color. Unmodified, there is insufficient head room for SC1 to accommodate a hidden signal. So an approximation of SC1 can be achieved by moving along both the SC channel and combining with other color channels. The other colors can include, e.g., process color inks (CMYK). A distance (e.g., a color error metric) 160 is preferably minimized to achieve an approximation of SC1 using an SC color channel value, SC2, +some combination of the other color channels (e.g., CMYK). SC2 can be a screened version of SC1.

Tweak values 162, which are introduced in the other color channels to carry an information signal, are determined. A floor 166 can be set within an optimization function to maintain a particular robustness of the hidden data. For example, reflection at a certain spectral band can be considered. Other robustness factors may include expected print distortion (e.g., plate mis-registration), scanner noise, color screen properties, printer resolution, illumination considerations, image characteristics, color values, etc. The magnitude of the tweaks can be optimized to ensure desired robustness. A visibility ceiling 164 can also be set to establish a visibility constraints. Factors here may include ink gamut limits, ink properties (e.g., metal effect), appearance model outputs, image masking outputs, printing angles, images characteristics, HVS outputs, CSF outputs, etc. Such robustness factors and visibility factors may be used as constraints for an optimization function. There may be situations where robustness is key, so distance function 160 is less important relative to the floor established by 166. In other cases, visibility concerns my trump robustness causing the ceiling 164 to contract.

Spot color and process color embedding can be implemented in many forms. Our preferred approach utilizes a software application plugin that cooperates with digital imaging software such as Adobe Photoshop or Adobe Illustrator. The plugin can be crafted (e.g., using the Adobe Photoshop SDK or the Adobe Illustrator SDK and programming tools such as Microsoft's Visual Studio) to provide user interfaces to select areas within digital image files for data hiding. The plugin may include or call various functions, routines and/or libraries to perform the data hiding techniques disclosed herein, e.g., including optimization processes, e.g., the IPOPT libraries, information signal generation (e.g., watermark embedder libraries), etc. The user interfaces may allow a user to select a type of data hiding for different digital image areas, e.g., spot color embedding, process color tints, etc. The plugin can be constructed to provide user interfaces to accept parameters such as robustness requirements, visibility requirements, global signal gain, etc. Such parameters can be entered graphically by moveable scale, entering numerical values, setting relative settings, etc. The plugin can be configured to operate autonomously. For example, the plugin can scan a digital version of a package design, determine flat areas (e.g., spot colors), process color and white spaces. The plugin can run an optimization to determine process color equivalents and tweaks for the spot colors, and determine CMY(K) tints for any white spaces or text areas.

Figure 24:
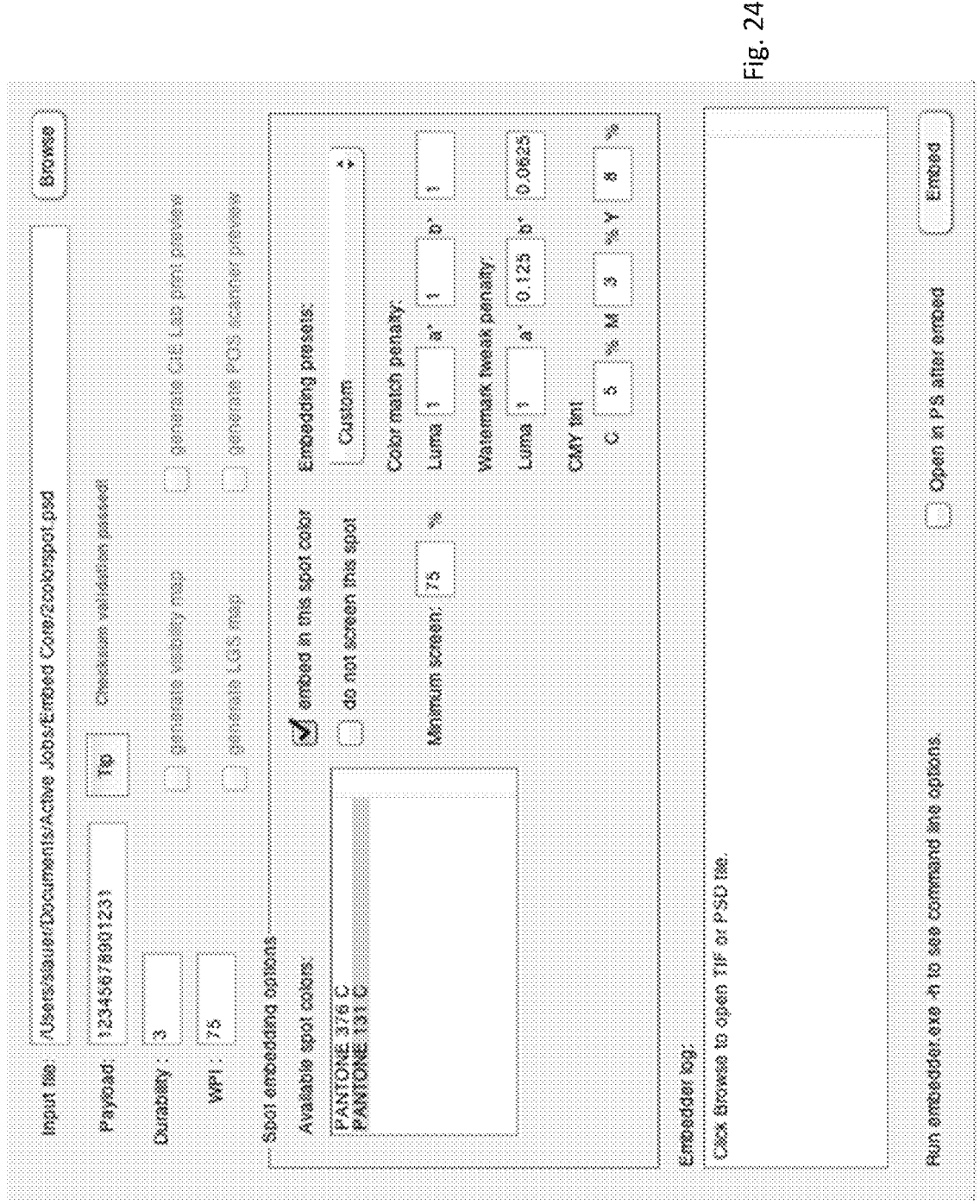
FIG. 24 show an example user interface for a plugin to achieve spot color embedding.

An example plugin user interface is shown in FIG. 24. The interface can provide various tunable options and displays, e.g., names of spot colors in a particular digital image, spot color screen amount, CMY tint values, payload information (and error correction checksum data), embed initiation tab, predicted detection maps ("LGS map," which is a heat map simulation how detectable an embedded signal is to a POS scanner), a tweak penalty to adjust global visibility of an embedded signal, a color match penalty to the adjust color hue or value due to watermark signal. In many cases the plugin is automated as discussed above, and can be configured to provide a reporting screen without (or prior to) user intervention.

Instead of a plugin in, the operations and functions described herein can be directly incorporated into digital image software applications or standalone applications.

Another implementation utilizes a web or cloud-based service. The web service provides user interfaces to upload or create digital imagery corresponding to product packaging. The web or cloud-based service houses or calls libraries, programs, functions and/or routines to achieve the spot color and process color embedding, including optimization, described herein.

The image processing operations for embedding and optimization may be implemented as instructions stored in a memory and executed in a programmable computer (including both software and firmware instructions) or executed on one or more processors, implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry may operate on electronic signals, or signals in other electromagnetic forms. These signals further represent physical signals like image signals, ink values and percentages, as well as other physical signal types captured in sensors. These electromagnetic signal representations are transformed to different states as detailed above to alter or modify ink values for physical product packaging.

This formulation of the embedding problem is not limited to spot ink being overprinted by CMY inks. The same formulation can be used with any set of inks that could be overprinted in the package design. For example, two spot colors could be used to embed information signals. This technique can be used for watermarking spot colors in Extended Gamut printing processes, e.g., such as Hexachrome printing. Constraints related to additional grayscale conversion weights from Eq. (7) can also be added to consider signal strength as seen by full-color devices such as mobile phones.

III. Additional Implementations and Description

Other implementations, description and embodiments are provided below.

One alternative but related embedding technology uses a blend model taking, e.g., a 4 color SWOP profile, and creates a 5 color profile (4 SWOP colors+S1a) to create a 5 color search space. The search space can be searched to find an optimized solution of robustness, readability, and minimized visibility changes. (Even if a black color is not used, it can be advantageous to search across a 4 color space.)

A SWOP profile refers to a profile provided by or following a specification of the "Specifications for Web Offset Publications." The SWOP specification covers many areas related to print production, complementing, extending and limiting those in other industry standards. The specification includes (but is not limited to) the following: I) A specification for the colors of the Cyan (C), Magenta (M), Yellow (Y) and key (Black) inks used in CMYK printing. Inks conforming to the specification can be called SWOP inks. The specifications make reference to, but are not identical to, the ISO standard ISO 2846-1:2006. II) A specification for the colors of proofs produced by various technologies, so they are close representation of the SWOP inks eventually used to print. Proofs made from systems that meet these specifications may be called SWOP Proofs. III) Specifications for expected dot gain (caused by ink dots enlarging over absorbent papers). IV) Requirements for producing halftones and color separation. V) Design constraints, such as the minimum size of type which is to be printed reversed or knocked out of a background, to keep legibility.

A first approximation of a combined color (e.g., S1a+CMY) may use the following process:

1. a) Reduce spot color (S1) percentage to yield a screened back spot color (S1a). This can aid in watermark detectability by a POS scanner, and b) estimate process color percentages (e.g., a CMY combination to overlay the spot color).

2. Estimate colorimetric coefficients for composite color, e.g., % S1a+xC+yM+zY, where % is the spot color screening percentage, and x, y and z are weighting or percentage coefficients for their respective process colors.

3. Correct color coefficients for spot overprint.

4. Determine values for overprint and percent spot color.

Predicting an actual color of a spot color ink when it is overprinted with another ink(s), or vice versa, can characterize each color individually and predict the color of overprinting solids and halftones by linearly combining the reflectance of all colors. Improvements can be made to this prediction by selectively weighting the combined colors. See, e.g., Deshpande, K. and Green, P. "A simplified method of predicting the colorimetry of spot colour overprints," 18th Color Imaging Conference: Color Science and Engineering Systems, Technologies and Applications, pg. 213-216, San Antonio, USA 2010, which is hereby incorporated herein by reference in its entirety.

Figure 13:
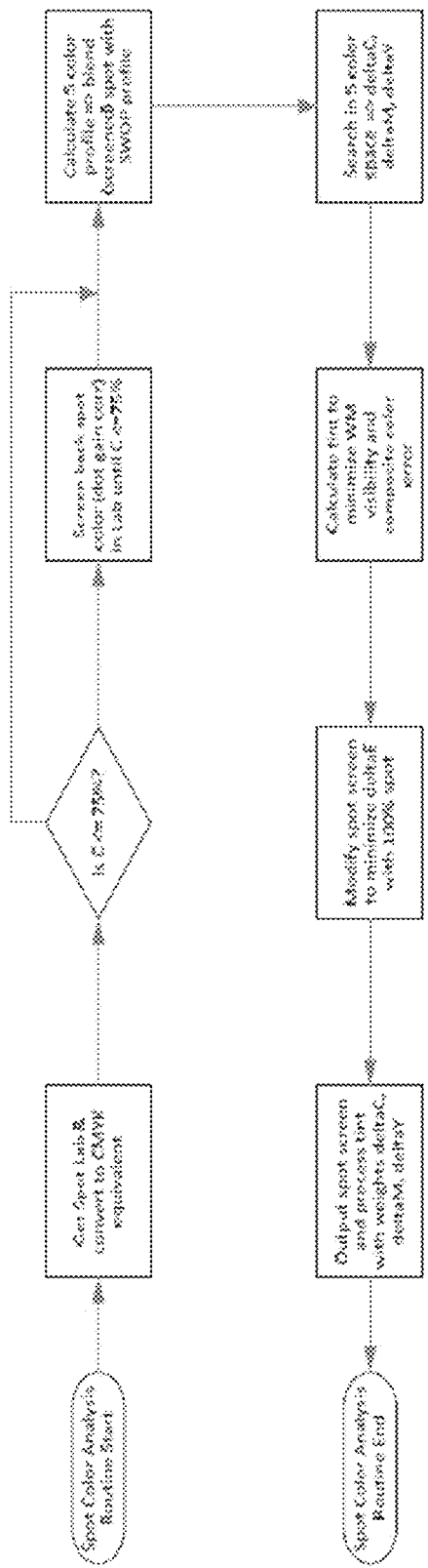
FIG. 13 is a flow diagram for a color embedding process.

FIG. 13 is a flow diagram illustrating one implementation of color blending to support digital watermarking with spot colors and process tints.

A spot color analysis starts with evaluating spot color S1. Spot color S1 can be represented in terms of its approximate Lab values, e.g., graphics software including Adobe Illustrator may include Lab libraries representing various spot colors. Ink manufactures will also likely have Lab values associated with each spot color. Once Lab values are obtained, the values can be converted to CMYK equivalents. Look up tables, data sheets, transformation equations and/or libraries can be consulted for this conversion. Of course, if CMYK values are originally available, one may be able to skip the Lab to CMYK conversion. It is then determined whether the Cyan component in the CMYK equivalent is less than or equal to 75%. If not, the spot color S1 is screened back (e.g., using dot gain correction to the Lab values) until the Cyan component is less than or equal to 75%.

Let's take a moment to discuss the focus on Cyan. Recall from above that we are contemplating use of a POS scanner with a red LED (or laser) which peaks at or around 660 nm. Cyan (like Black) has very low reflectivity at or around 660 nm.

Couple that with the spectral response of a RED LED scanner we would prefer to introduce watermark tweaks in the Cyan channel so they can be readily 'seen' with a red scanner/camera. Such a Red LED capture device is likely monochromatic. Thus, the capture device (e.g., camera) only 'sees' colors which reflect at or around 660 nm. If color strongly reflects at this wavelength the camera 'sees' white. Bright yellow, magenta, pink, orange and white are all 'seen' as white by the capture device. If color reflects 0% at this wavelength (e.g., absorbs the wavelength) the camera 'sees' black. Dark blue, Cyan, green, purple and black are all 'seen' as black by the camera. Thus, when using a RED LED scanner, watermark detection includes a spectral dependence; successful watermark embedding, therefore, includes embedding receptive to the particular spectral dependence.

We left the FIG. 13 flow diagram discussion at screening back spot color S1 if the CMYK equivalent is not less than or equal to 75%. Recall that we are going to combine the screen backed spot color S1a with process color equivalents, with the watermark signal preferably being carried in the process colors. And, if using a red color laser or LED, we want to match the red with tweaks in Cyan so that they can be more readily seen by the capture device. So, if the spot color S1a is Cyan heavy, it may risk washing out the printed CMY. That is, the Cyan heavy S1a introduces noise such that the watermark tweaks in the underlying process colors are difficult to detect. Depending on the application and tolerance for noise, a Cyan trigger in the range of, e.g., 60-85%, can be used to decide whether to screen spot color S1.

The combined screened spot color+modulated process colors can be evaluated against the 100% spot to determine whether the combined tint has an acceptable luminance error. For example, $\Delta E76$, $\Delta E94$ and/or $\Delta E2000$ values can be calculated. If a combined tint shows a large error, then different watermark signal tweaks can be iteratively explored until and acceptable error is found. Acceptable in this context can be predetermined based on use. For example, if detection robustness is a primary concern, more watermark visibility can be tolerated.

Next, watermark tweaks are calculated for the CYM process colors. The tweaks can be represented as, e.g., magnitude changes to the determined process color percentage values. Once the tweaks are calculated, they can be used to selectively transform the process colors to convey the digital watermark signal. In some examples, determined tweaks are converted to linear RGB, and scaled for underlying spot reflectivity in linear RGB. These scaled values are converted back to CMY as embedding magnitudes or weights for magnitudes.

Figure 14:
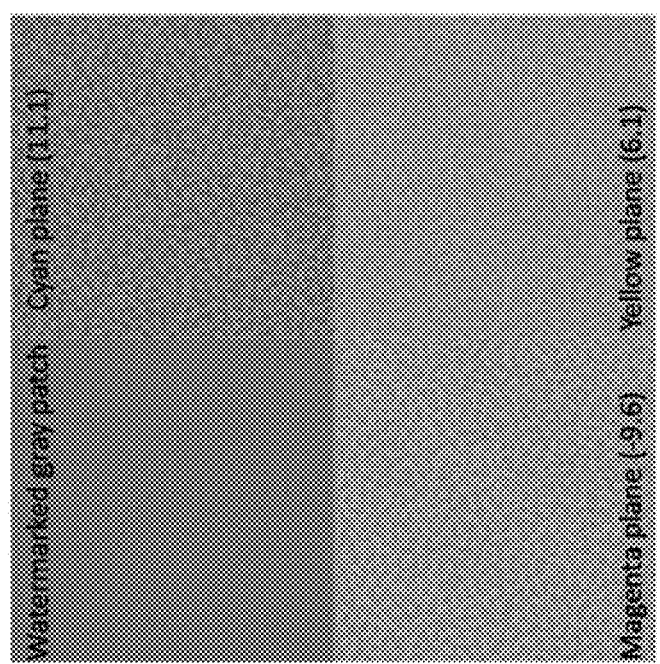
FIG. 14 show a watermarked gray patch (top left), watermark tweaks in a Cyan plane (top right, with a value of 11.1), watermark tweaks in a Magenta plane (bottom, left, value of −9.6), and watermark tweaks in a Yellow plane (bottom right, value of 6.1)

We have discussed a spectral dependency when reading watermarking with, e.g., a red LED capture device/camera. But using such a narrow band illumination leaves a lot of watermark signal unusable by a detector. Recall from above that watermark tweaks in cyan (and yellow) are offset with magenta changes having opposite polarity. This helps reduce watermark visibility by keeping luminance changes at a minimum. For example, a monochrome perspective (e.g., an ink view) of a Cyan plane, a Magenta plane and a Yellow plane are shown with relative magnitude tweak changes in FIG. 14. When the C, M and Y planes are superimposed in print (top left patch), luminance change attributable to the watermarking tweaks is reduced.

Figure 15:
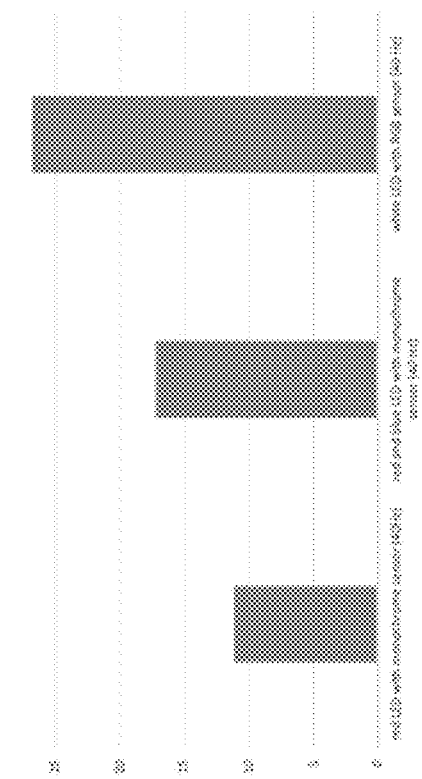
FIG. 15 is a diagram showing relative signal standard deviation for signal capture with a monochrome sensor with red illumination & red and blue illumination and white illumination (with an RGB sensor)

But, if captured with a red LED scanner/camera, only the cyan tweaks are seen for watermark reading purposes. Watermark signal per unit visibility can be increased by using, e.g., 2 or more color illuminations. For example, with reference to FIG. 15, relative signal standard deviation is increased (see middle bar) when illuminating with both a red and blue LED (with a monochrome sensor), and further increases when illuminating with a white light LED and capturing with RGB sensors (right bar). Cyan plane is seen by red LED scanner/sensor, magenta by green LED scanner/sensor and yellow by blue LED scanner/sensor.

Figure 16:
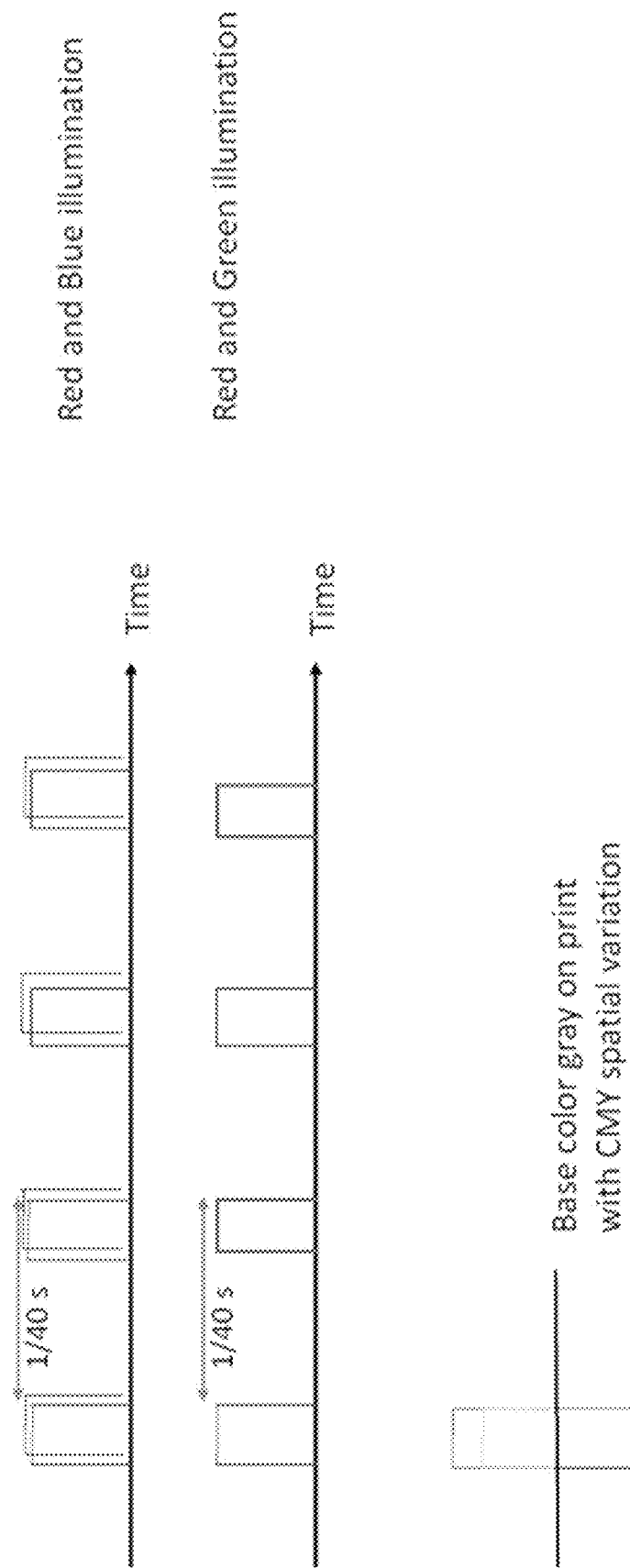
FIG. 16 shows relative illumination timing.

With reference to FIG. 16, we show relative timing with 2 color illumination with a monochromic sensor(s). Illumination with Red and Green LED may allow for better capture and timing. For example, if using only 1 monochromic sensor, the illumination of the red and green LEDs can be delayed or spaced to allow for image data corresponding to Red illumination to be captured and buffered before image data corresponding to Green illumination is captured on the same sensor. Data captured corresponding to red illumination can be combined with data captured corresponding to green illumination to bolster the hidden signal-to-noise ratio.

In other arrangements, e.g., 3 color illumination and multiple monochromatic sensors, each sensor includes its own particular color filter. For example, each sensor includes a particular filter so that it can see Cyan, Magenta or Yellow. Information from these sensors can be combined to further increase signal strength prior to embedding.

Flexo prints are sometimes used for plastics and foils, including those used in the food industry. This type of printing often is difficult when trying to introduce fine ink percentage changes (e.g., for watermarking), or to achieve close plate color registration. This type of printing typically uses spot colors, and typically not process color inks due to the large screen size.

Some of the above implementations utilize process colors+screened spot color, with a watermark signal conveyed by modulating the process colors. Since flexo printing does not typically include process colors, a different approach can be employed.

Figures 17, 18:
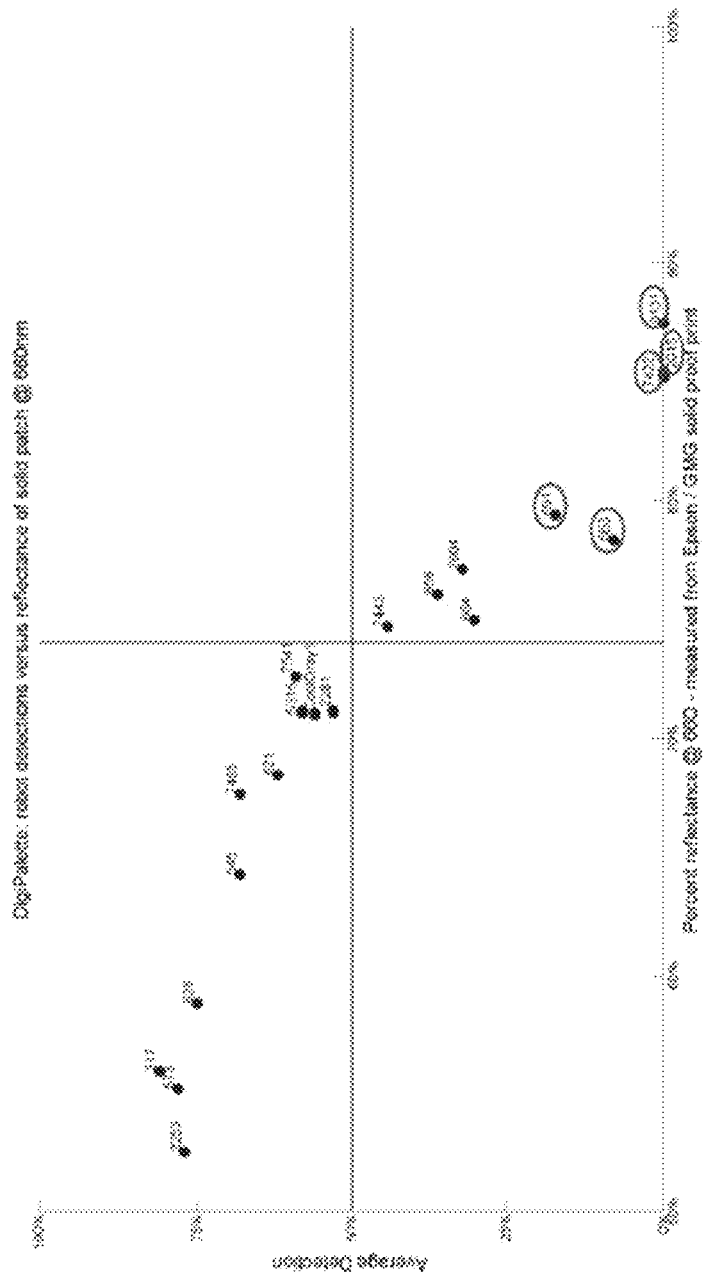
FIG. 17 is a plot showing various colors and their reflectance percentages.
FIG. 18 is a color palette corresponding to the plot in FIG. 17.
Figure 19:
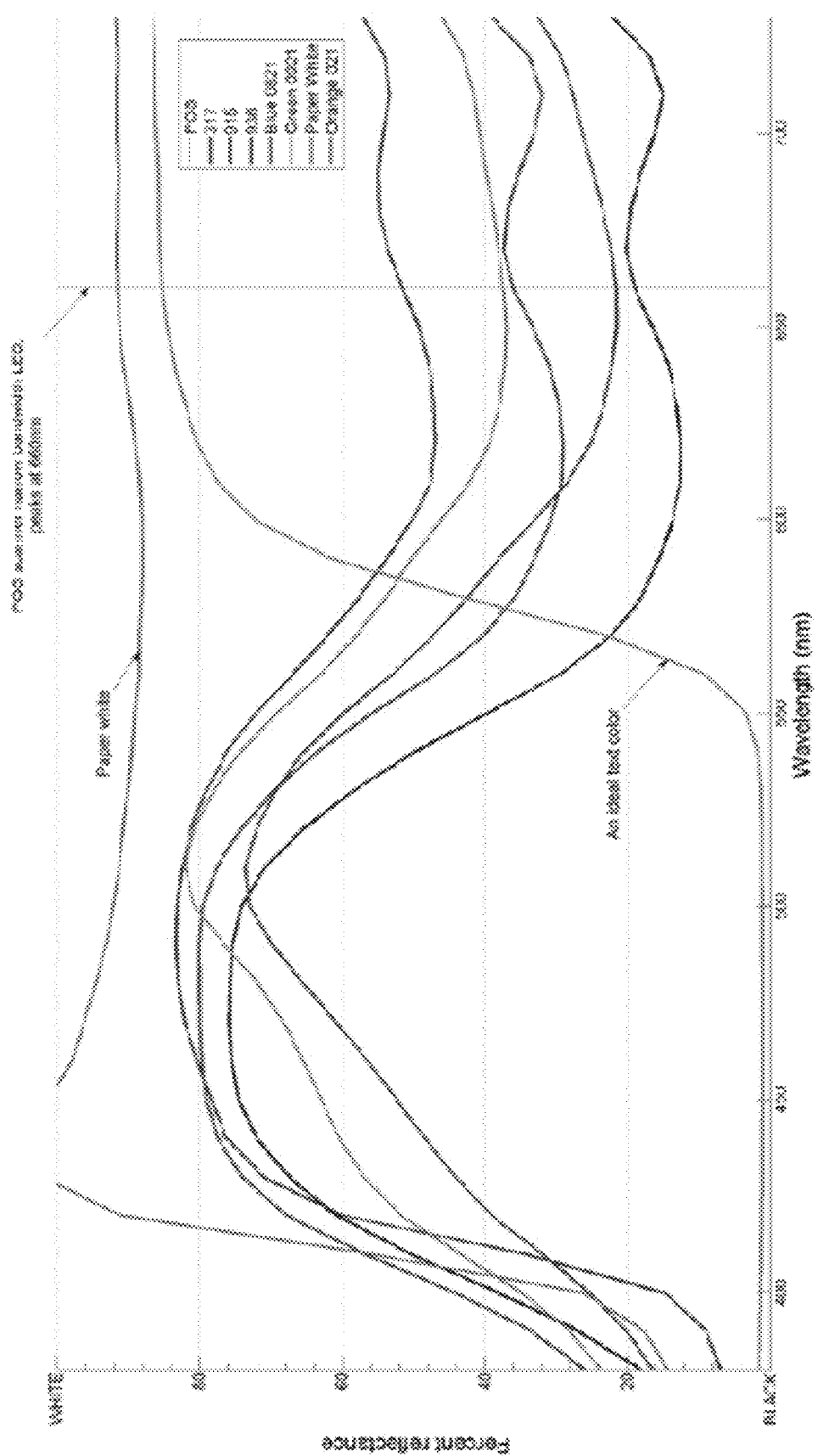
FIG. 19 is a graph showing percent reflectance at different wavelengths for various colors.

One such approach combines a flexo spot color, perhaps even a screened version of such, and combines with an additional spot color which is preferably light, has high reflectance at all wavelengths except at or around 660 nm, and potentially another area. FIGS. 17, 18 and 19 show some potential candidates for the additional spot color including cyans, greens, and purples. The original spot color is modulated with tweaks to convey a watermark signal, which can have a luminance offset from the additional spot color.

Some criteria for selecting suitable overprint spot colors may include:

(if using a red LED scanner) reflectance between 50%-80% at 660 nm; CIE L* between 82-90; and are a representative color in every CIE hue 18 degree increments/20 colors total in first investigation.

Another approach pairs spot colors. For example, given a spot color, two (2) different spot colors which can be each modulated to include a digital watermark signal are identified. The modulated 2 different spot colors when combined are visually a close approximation of the original spot color.

Added text on packaging can sometimes interfere with a watermark signal. For example, black text may been seen by a red LED camera as black (high absorption). Colors with high reflectance at the target peak scanner response can instead be used for text. Referring again to FIG. 19, orange is an ideal color for text.

Figure 20A:
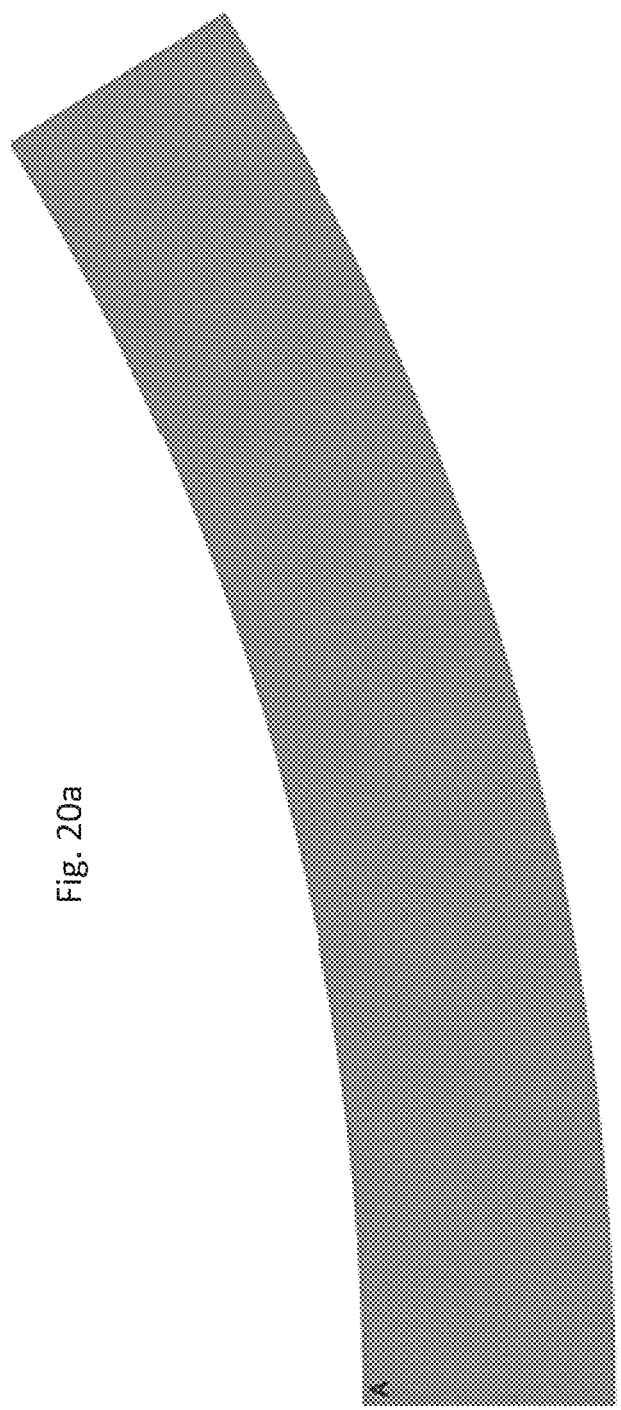
FIG. 20a is a diagram showing warping for a design when packaged.
Figure 20B:
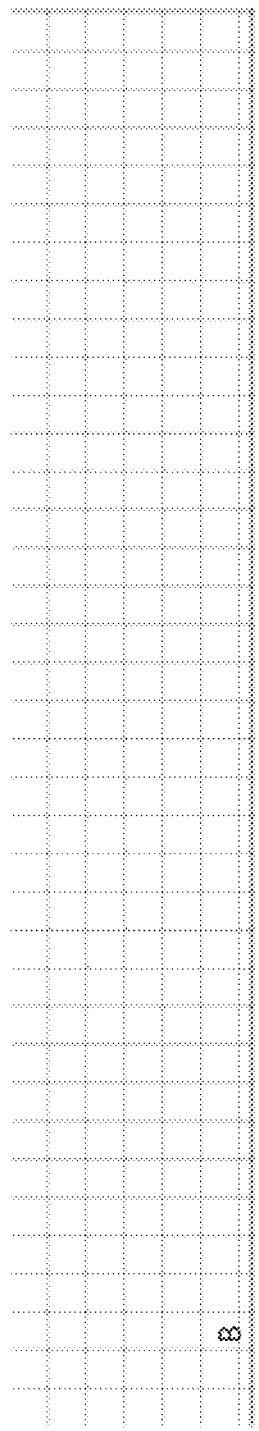
Figure 20B:
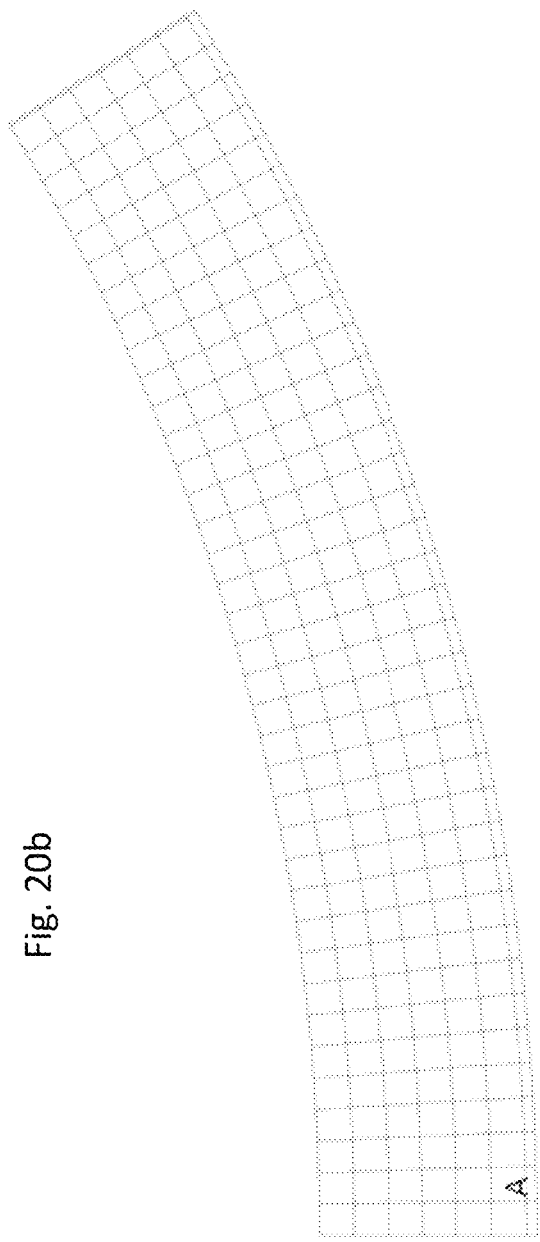

Oftentimes printed packaging is applied to non-flat surfaces. For example, printed plastic foil can be shrink-wrapped on and around a container. Examples include, e.g., yogurt cups, energy drink bottles, toppings containers, etc. The plastic foil can be modeled to the container with shrink wrapping, e.g., heat wrapped. Heat wrapping introduces distortion to the printing. Distortion is modeled for printed foil intended for a yogurt cup in FIGS. 20a and 20b. Item B is a printed plastic foil pre-shrink wrap. Item A includes distortion modeling of the post shrink wrapped version of item B. In FIG. 20b, a trapezoid distortion is shown by the gridding.

One method for modeling trapezoidal distortion determines circumference points for the top and bottom of the yogurt cup. A linear transformation maps points from the top (wider) circumference into the bottom (smaller) circumference points, with transformation distortion depending on a target 3D container's shape. Of course, other 3D models can be used to estimate or predict how a watermark signal will be mapped onto a 3D object like product packaging. Such transformations can be used to pre-condition host images. For example, various 3D models are discussed, e.g., in U.S. Pat. No. 8,570,343, which is hereby incorporated herein by reference in its entirety, can be used.

Such distortion will adversely affect watermark detection. For example, a watermark may include an orientation component that can be compared against a reference template to help determine distortion of captured imagery including the orientation component. The shrink wrap process can further complicate the interpretation of the orientation and distortion.

One method addresses distortion by warping (e.g., transforming) a host image prior to watermark embedding. For example, if item B is a host image, then a transformation T1 which models expected distortion is applied to item B to yield item A. A watermark signal is embedded in image A, and then image A is inversely transformed to yield item B. The inversely transformed item B, which includes a distorted watermark signal, can then be shrink-wrapped or otherwise applied to the container (yogurt cup). The shrink wrapping introduces distortions estimated for by the transformation T1, which yields a watermark signal which is more closely aligned to the originally embedded watermark (e.g., as embedded in image A).

Figure 21:
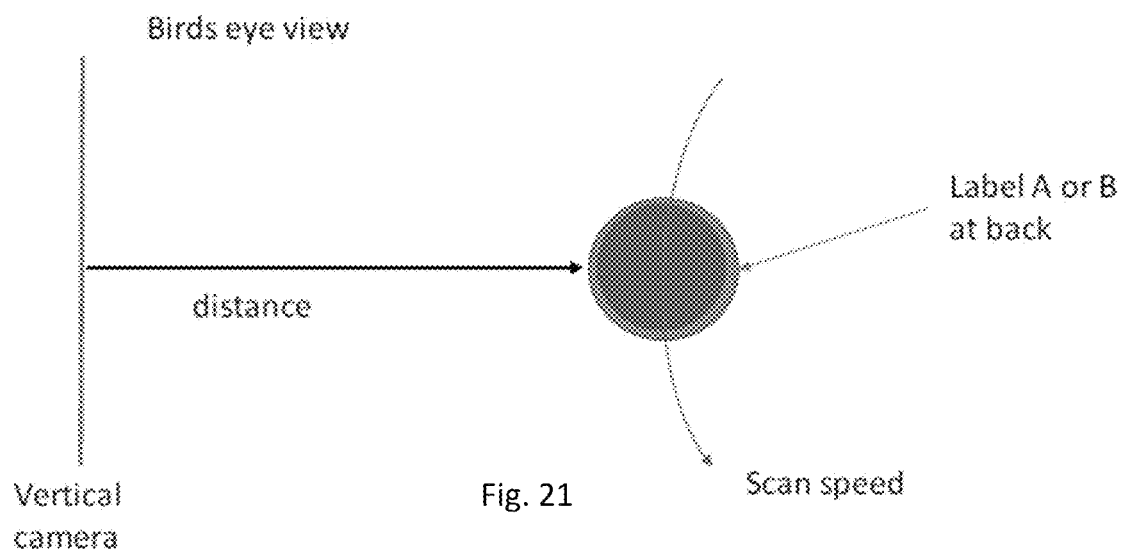
FIG. 21 is diagram showing scanning of a packaged product at different scanning speeds.
Figure 22:
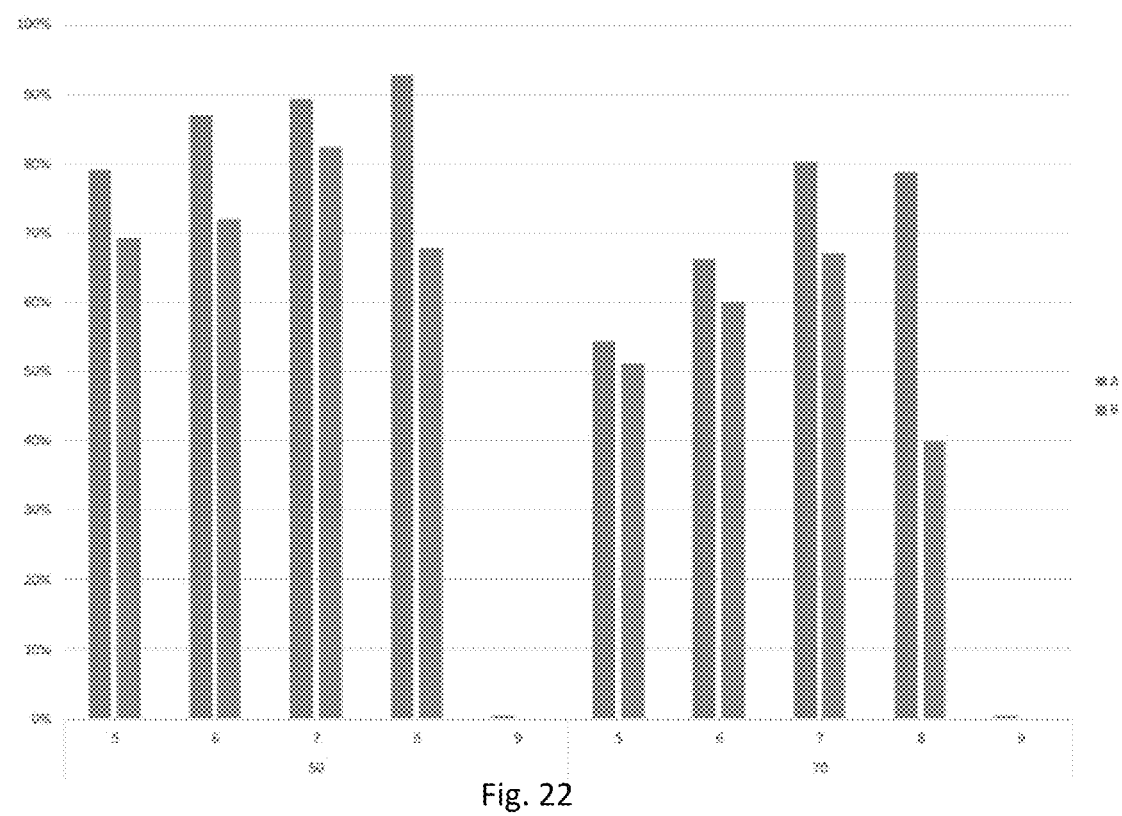
FIG. 22 is a bar chart showing percentage of successful watermark detections at different watermark resolutions (50 & 70 watermark per inch) and increasing scanning speeds/inch in a simulated test.

We designed a test to investigate whether watermark detection robustness is better if:

Image transformed T1 and then watermarked=>A
Image watermarked and then Transformed T2=>B In this test we simulated a marked yogurt cup moving parallel to a red LED scanner bed about ¼" above a bottom scanner to simulate a checker scanning the yogurt cup. The cup was simulated by two different A & B printed graphic on a paper substrate, and then wrapped around a yogurt container. The simulated cup is then passed in front of a vertical camera at various speeds as shown in FIG. 21. The results are shown in FIG. 22, where percentage of successful watermark detections at different watermark resolutions (50 & 70 watermark per inch) and increasing scanning speeds/inch is shown. At each tested scanning speed, the watermark was detected with a higher percentage when embedded after image transformation (B).

In assignee's U.S. Provisional Patent Application No. 60/032,077, filed Aug. 1, 2014, and 62/102,270, filed January 12, each of which is hereby incorporated herein by reference, we discussed various digital watermarking embedding Workflow Processes.

Figure 23:
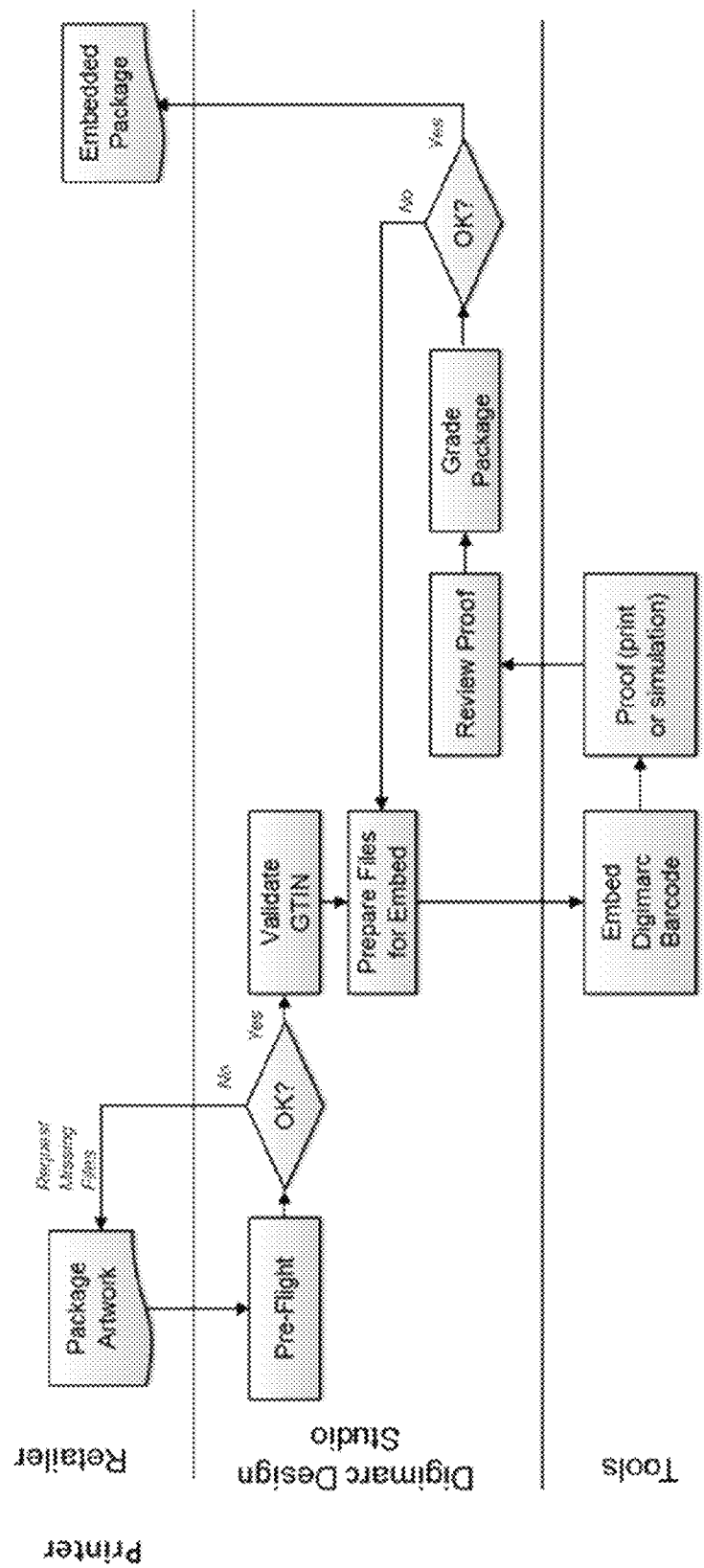
FIG. 23 is a flow diagram for a package design and data hiding work flow.

A related process may include one or more of the following processes, with general reference to FIG. 23:

1) Receive digital package files from, e.g., via a secure FTP.

2) Pre-Flight to determine that we have all info. Pre-flight is a term used to describe a preliminary step that evaluates received information, and may include reformatting, decompressing files, and an overall evaluation whether the received digital page files can be assembled into a printable package. Package artwork is typically represented by a collection of files in a variety of different formats e.g., Bitmaps (*.tiff, *psd, etc.), vector imagery (*.ps, *.ai, etc.), and fonts (*.abf, *.ttf, etc.). A final rendered packaged can be "built" using the aforementioned files using a variety of different strategies, from a 1-layer bitmap to numerous layers of vector and bitmap imagery utilizing multiple fonts.

3) Enter Package/Retailer/Printer/Supplier in CRM system, e.g., Microsoft Dynamics CRM (not shown). Optionally, the materials may include an XML file which can be used to automatically enter the information. In this case, a manual check will help ensure accuracy.

4) Assign to Teams. For example, different tasks can be assigned to different work stations, or to available operators. An operator queue can be examined to determine availability.

5) Create an identity file in an identity management system (e.g., housed in the cloud) and associate the GTIN. The creation and management of these services can be accomplished through a web-portal to the identity management system or programmatically through Web APIs. If the packaging materials includes a barcode number, e.g., in a GTIN format, this information can be obtained and provided as a watermark payload or part of a watermark payload, or to a storage location at which a watermark will point to.

6) Review Files—Different Classifications. These classification may include assignment of package embedding difficultly. This may prompt additional resources or billing requirements.

7) Print-out Initial Client Proof.

8) EMBED Digimarc Barcode. For example, the spot color and process color embedding methods and technology disclosed herein can be employed at this step.

8a) In the digital realm, grade the embedded Digimarc Barcode. For example, watermark signal strength across the package can be assigned values, and based on corresponding reads for the values a grade can be assigned per package side or area.

9) Print Watermarked Proof

10) Test on POS Scanner. This is a preliminary test to see if the proof will read.

11) Assemble Package for Manual Test

12) Manual Test. This can be a detailed process, where each package face is tested, e.g., at different reading angles. For example, each side is tested on a POS scanner with a vertical camera and a horizontal camera. The package is passed over the scanner, e.g., 2, 4 or 8 times per side and then number of reads is recorded. The side is rotated, e.g., 90 degrees and the process is repeated for that side, rotated again and retested, etc. Each package side can be so tested and the results recorded. A grade can be assigned based on successful reads. Of course, the process is benefited from automation where a package is passed in front of a scanner, e.g., with a robot arm, conveyor belt or some other movement mechanism.

13) Complete QC Checklist 13a) compare results of digital grade and manual grade; decide whether to accept or refine embedded package.

14) Send Approved file to Customer via FTP

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Appendix A is expressly included as part of this specification and is incorporated herein by reference in its entirety.

The methods, processes, components, technology, apparatus and systems described above may be implemented in hardware, software or a combination of hardware and software. For example, the spot color and process color embedding and optimizations may be implemented in software, firmware, hardware, combinations of software, firmware and hardware, a programmable computer, electronic processing circuitry, digital signal processors (DSP), graphic processing units (GPUs), a programmable computer, electronic processing circuitry, and/or by executing software or instructions with a processor, parallel processors, multi-core processor and/or other multi-processor configurations.

The methods and processes described above (e.g., watermark embedders and detectors) also may be implemented in software programs (e.g., written in C, C++, C#, R, Assembly, Objective-C, Shell, Scheme, Scratch, MATLAB, Visual Basic, Java, Python, Tcl, Perl, Scheme, Ruby, executable binary files, etc.) stored in memory (e.g., a computer readable medium, such as an electronic, optical or magnetic storage device) and executed by one or more processors, multi-core processors, distributed systems (or electronic processing circuitry, hardware, digital circuit, etc.).

The particular combinations of elements and features in the above-detailed embodiments (including Appendix A) are exemplary only; the interchanging and substitution of these teachings with other teachings in this and the incorporated-by-reference patents and documents are also contemplated.

What is claimed is:

1. A retail product package comprising:
a first printed area, the first printed area comprising a combination of i) data representing first color data (S1), and ii) data representing second color data (S2), in which encoded information is provided on said retail product package through modulation of the data representing second color data (S2) with max (positive) and min (negative) tweaks;
in which the combination has been optimized by:
determining a color error between data representing third color data (S3) and a combination of S1 and S2,
determining an information modulating error associated with the max and min tweaks; and
finalizing the combination of S1 and S2, including minimizing the color error and minimizing the information modulating error; and
a second printed area including a 1D or 2D barcode;
a third printed area including text information printed thereon.

2. The retail product packaging of claim 1 in which the combination has been optimized by a process which included determining color weights and a global signal strength, the color weights to be applied to the data representing second color data (S2) and the global signal strength for regulating the modulation.

3. The retail product packaging of claim 2 in which the combination has been optimized by a process constrained by spectral reflectance between 630 nm to 680 nm.

4. The retail product packaging of claim 2 in which combination has been optimized by a process constrained by spectral reflectance between 655 nm to 670 nm.

5. The retail product packaging of claim 2 in which the data representing second color data (S2) comprises data representing two or more process colors, and the data representing first color data (S1) represents a spot color.

6. The retail product packaging of claim 5 in which the spot color comprises a screened-back version of the third color data (S3).

7. The retail product packaging of claim 1 in which the max and min tweaks correspond to a 2-dimensional image digital watermark tile.

8. An image processing system for generating a design for a retail product package comprising:
memory storing data representing first color data (S1);
one or more multi-core processors configured for:
minimizing: i) a color match error between (S1) and a combination of data representing second color data (S2) and data representing third color data (S3), the combination including auxiliary encoded information in (S3), and ii) an information modulating error associated with modulations of (S3) that carry the auxiliary encoded information,
said minimizing being constrained by a spectral component associated with an anticipated information detector,
obtaining color percentage values associated with at least (S3) and a signal strength value for regulating the modulations; and
an output configured for outputting the color percentage values and a signal strength value.

9. The image processing system of claim 8 in which the spectral component comprises a metric associated with a spectral reflectance between 650 nm to 680 nm.

10. The image processing system of claim 8 in which the modulations correspond to a 2-dimensional image digital watermark tile.

11. The image processing system of claim 8 further comprising a display, in which said one or more multi-core processors are configured for providing a graphical user interface through which encoding options can be selected.

12. The image processing system of claim 8 in which the combination is optimized by determining color weights and a global signal strength, the color weights to be applied to the data representing third color data (S3) and the global signal strength for regulating the modulation.

13. An image processing apparatus comprising:
memory storing color data representing a spot color ink;
memory storing a table to obtain data representing a process color ink tint, the process color ink tint including at least a Cyan (C) component, a Magenta (M) component and a Yellow component (Y);
one or more multi-core processors configured for:
simulating an overprinting of the color data with the process ink tint;
decomposing the process ink tint into a maximum signal tweak and a minimum signal tweak, each of the maximum signal tweak and the minimum signal tweak having a Cyan (C) component, a Magenta (M) component and a Yellow component (Y);
minimizing a color error metric of the overprinting relative to the data representing the spot color ink;
optimizing the maximum signal tweak and the minimum signal tweak according to at least a spectral dependency, in which said optimizing comprises determining color weights and a global signal strength;
modulating the process color ink tint with the maximum signal tweak and the minimum signal tweak to represent an information signal, the color weights for application to the process color tint and the global signal strength;
outputting the modulated process color ink tint for overprinting with the color data.

14. The image processing apparatus of claim 13 in which the spectral component comprises a metric associated with a spectral reflectance between 650 nm to 680 nm.

15. The image processing apparatus of claim 13 in which the information signal corresponds to a 2-dimensional image digital watermark tile.

16. The image processing apparatus of claim 13 further comprising a display, in which said one or more multi-core processors are configured for providing a graphical user interface through which modulating options can be selected.

17. A system for transforming color data to include an information signal embedded therein, comprising:
memory storing spot color data, and system constraint information, the system constraint information including at least one spectral dependency; and
one or more multi-core processors configured to generate C (Cyan), M (Magenta), Y (Yellow) process color data, and to combine the generated process color data with the spot color data to yield a combination having a minimized color error approximation of the spot color data, the one or more multi-core processors configured to generate signal modulation values in terms of at least ΔC, ΔM, ΔY for modulating the C, M, Y process color data to carry the information signal, the modulation values optimized based on the at least one spectral dependency; and one or more multi-core processors configured as an signal embedder that transforms the C, M, Y process color data with the signal modulation values.

18. The system of claim 17 in which the spot color data comprises a screen of spot color data.

19. The system of claim 17 in which the signal modulation values correspond to a 2-dimensional image digital watermark tile.

20. The system of claim 17 in which the at least one spectral dependency comprises a wavelength at 660 nm.

21. A method for generating a design for a printed article comprising:
minimizing: i) a color match error between a first color (S1) and data representing second color data (S2), the second color data (S2) including auxiliary encoded information, and ii) an information modulating error associated with modulations of the second color data (S2) that carry the auxiliary encoded information, said minimizing being constrained by a spectral component associated with an anticipated information detector, in which said minimizing yields color percentage values associated with at least the data representing second color data (S2) and a signal strength value for regulating the modulations; and outputting the color percentage values and a signal strength value for use in a design to be printed on the printed article.

22. The method of claim 21 in which the modulations correspond to a 2-dimensional image digital watermark tile.

23. The method of claim 21 in which the first color (S1) comprises a screened back version of a spot color.

24. The method of claim 21 in which the second color data (S2) comprises data representing Cyan (C), Magenta (M), and Yellow (Y).

* * * * *